(12) United States Patent
Uchiyama

(10) Patent No.: US 11,212,708 B2
(45) Date of Patent: Dec. 28, 2021

(54) RELAY COMMUNICATION DEVICE, BASE STATION, METHOD, AND RECORDING MEDIUM

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 157 days.

(21) Appl. No.: 16/479,041

(22) PCT Filed: Dec. 14, 2017

(86) PCT No.: PCT/JP2017/044963
§ 371 (c)(1),
(2) Date: Jul. 18, 2019

(87) PCT Pub. No.: WO2018/142784
PCT Pub. Date: Aug. 9, 2018

(65) Prior Publication Data
US 2021/0136628 A1 May 6, 2021

(30) Foreign Application Priority Data
Feb. 3, 2017 (JP) .............................. JP2017-018271

(51) Int. Cl.
*H04W 28/18* (2009.01)
*H04W 88/04* (2009.01)

(52) U.S. Cl.
CPC ............ *H04W 28/18* (2013.01); *H04W 88/04* (2013.01)

(58) Field of Classification Search
CPC ..... H04W 24/10; H04W 76/14; H04W 88/04; H04W 72/085; H04W 72/0453; H04W 72/02
See application file for complete search history.

(56) References Cited

U.S. PATENT DOCUMENTS

2008/0049653 A1 2/2008 Demirhan et al.
2010/0027457 A1* 2/2010 Okuda .............. H04W 72/0413
370/315
(Continued)

FOREIGN PATENT DOCUMENTS

CN 101286795 A 10/2008
CN 102523625 A 6/2012
(Continued)

OTHER PUBLICATIONS

International Search Report and Written Opinion of PCT Application No. PCT/JP2017/044963, dated Mar. 13, 2018, 06 pages of ISRWO.

(Continued)

*Primary Examiner* — Syed Ali
(74) *Attorney, Agent, or Firm* — Chip Law Group

(57) ABSTRACT

The present technology provides a system that can provide relay communication adaptive to a communication status between a relay terminal and a remote terminal. A relay communication device that is made movable and relays communication between a base station and a remote terminal includes a determination unit configured to determine a parameter set on the basis of information indicating a communication status related to distance or traffic between the relay communication device and the remote terminal, the parameter set being settable regarding communication between the relay communication device and the remote terminal, and a notification unit configured to notify the remote terminal of information indicating a determination result by the determination unit.

19 Claims, 15 Drawing Sheets

(56) References Cited

U.S. PATENT DOCUMENTS

| | | |
|---|---|---|
| 2015/0334762 A1 | 11/2015 | Yang et al. |
| 2015/0358973 A1 | 12/2015 | Zeger et al. |
| 2016/0204847 A1 | 7/2016 | Ryu et al. |
| 2016/0295565 A1 | 10/2016 | Kim et al. |
| 2017/0086114 A1* | 3/2017 | Jung .................... H04B 17/327 |
| 2017/0367118 A1* | 12/2017 | Choi ..................... H04W 84/12 |
| 2018/0054237 A1* | 2/2018 | Tseng ................ H04W 36/0033 |
| 2018/0076878 A1 | 3/2018 | Ryu et al. |
| 2018/0123682 A1* | 5/2018 | Jung .................... H04B 7/2606 |
| 2018/0152986 A1* | 5/2018 | Jung ..................... H04W 76/27 |
| 2018/0212746 A1* | 7/2018 | Kazmi .................. H04L 1/1825 |
| 2018/0249516 A1* | 8/2018 | Jung ..................... H04W 76/14 |
| 2018/0302202 A1* | 10/2018 | Kim ...................... H04L 5/0048 |
| 2019/0090250 A1* | 3/2019 | Lee .................... H04W 72/0446 |
| 2019/0124491 A1* | 4/2019 | Lim ........................ H04W 4/40 |
| 2019/0229964 A1* | 7/2019 | Ouchi ................. H04L 27/2613 |
| 2020/0221532 A1* | 7/2020 | Jung ..................... H04W 76/10 |

FOREIGN PATENT DOCUMENTS

| | | |
|---|---|---|
| CN | 104105142 A | 10/2014 |
| CN | 105474558 A | 4/2016 |
| CN | 106165510 A | 11/2016 |
| EP | 1981223 A1 | 10/2008 |
| EP | 056545 A1 | 5/2009 |
| EP | 109268 A1 | 10/2009 |
| JP | 11-298969 A | 10/1999 |
| JP | 2008-263431 A | 10/2008 |
| JP | 4900007 B2 | 3/2012 |
| JP | 2016-096489 A | 5/2016 |
| KR | 10-2008-0092882 A | 10/2008 |
| KR | 10-2016-0041931 A | 4/2016 |
| WO | 2015/026111 A1 | 2/2015 |
| WO | 2016/178627 A1 | 11/2016 |
| WO | 2017/007285 A1 | 1/2017 |

OTHER PUBLICATIONS

Extended European Search Report of EP Application No. 17894763.6, dated Dec. 13, 2019, 07 pages.

Office Action issued in Taiwan Appln. No. 107102428 dated May 18, 2021.

* cited by examiner

FIG. 2
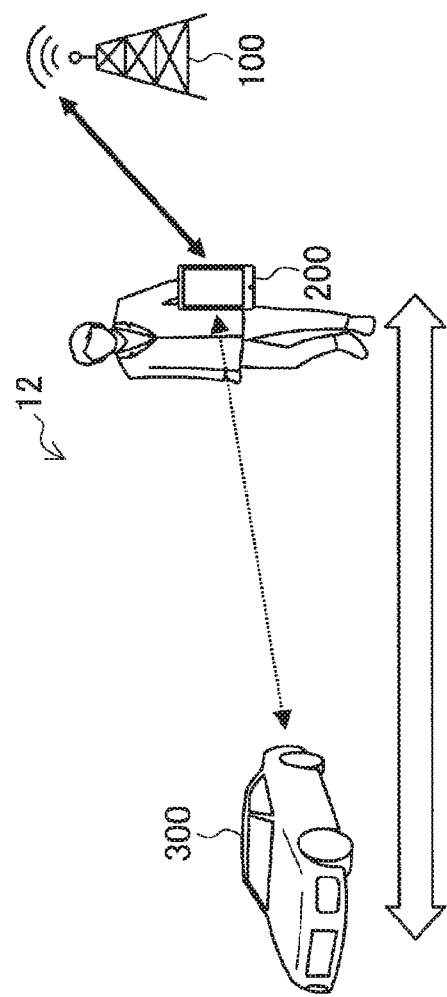
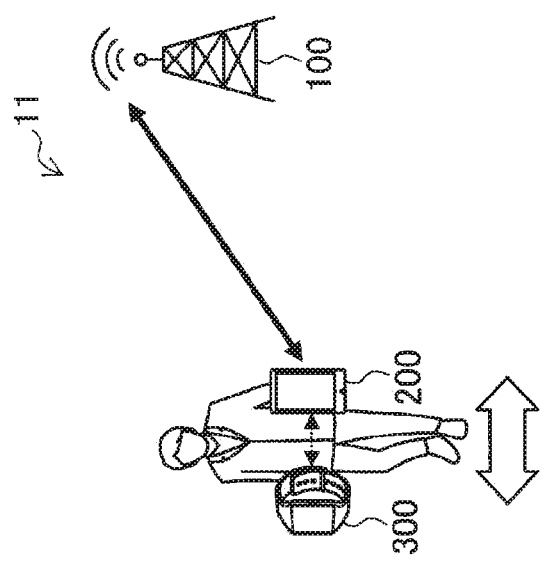

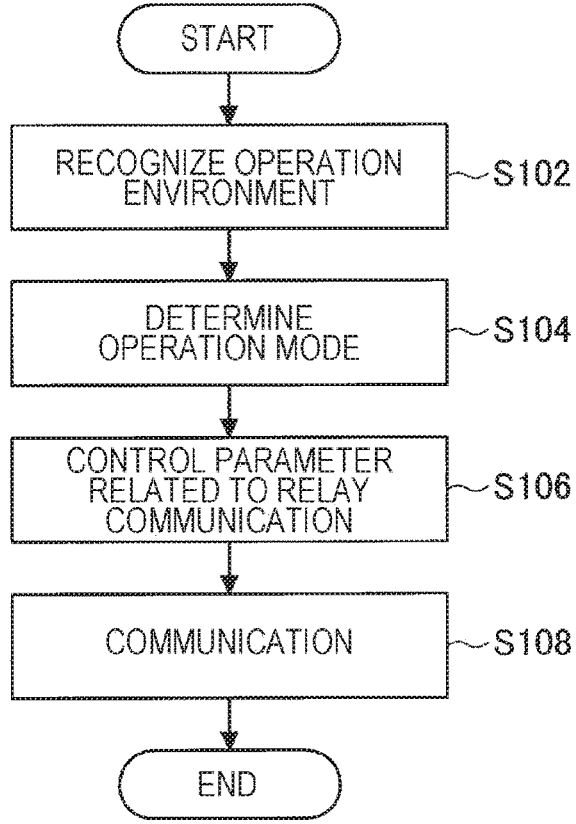
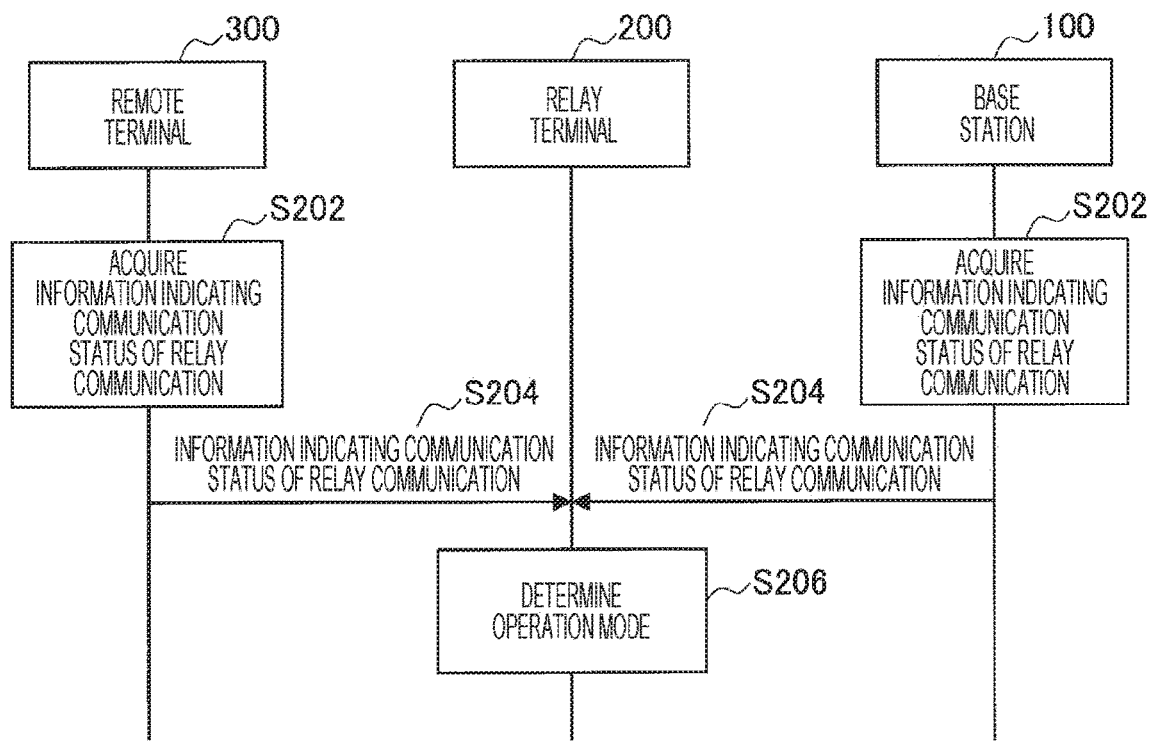

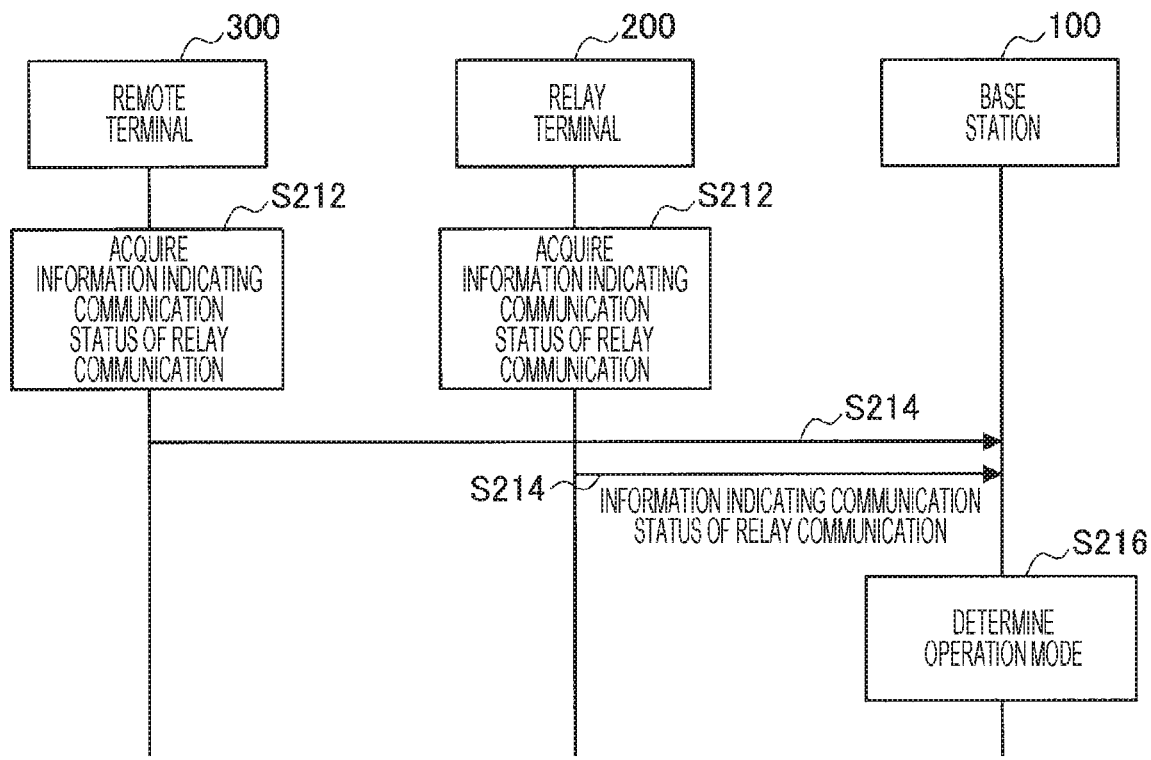
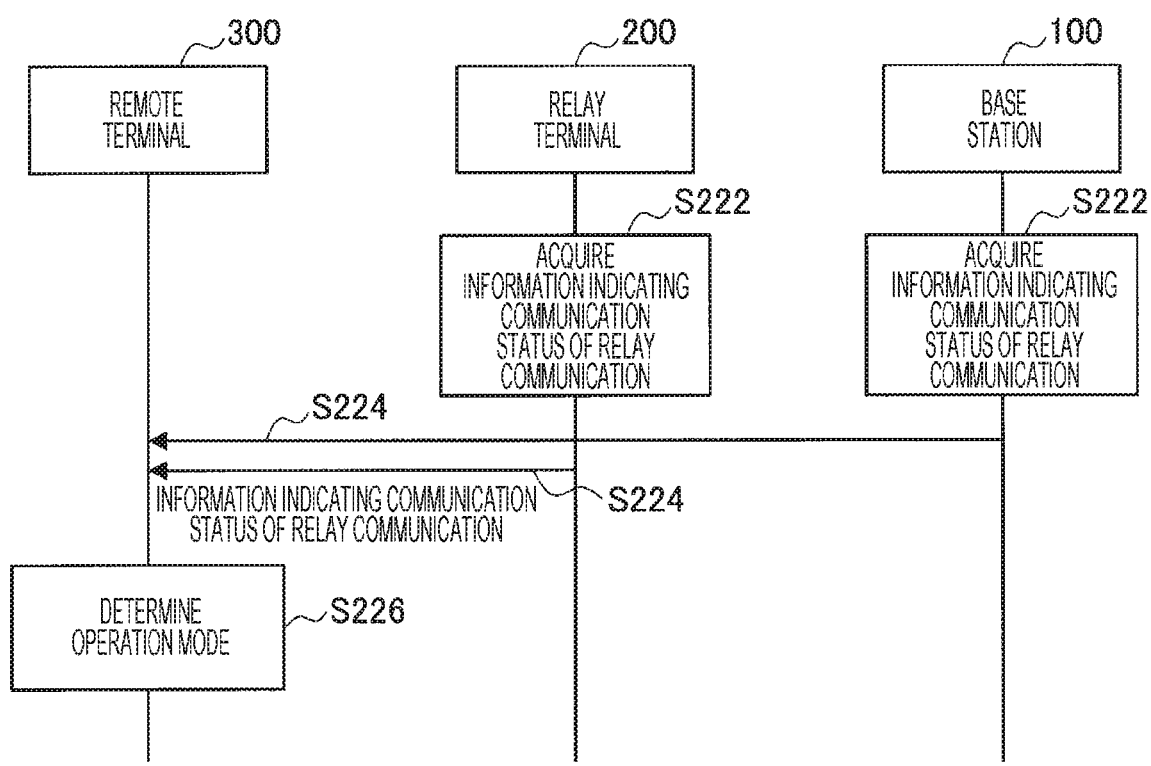

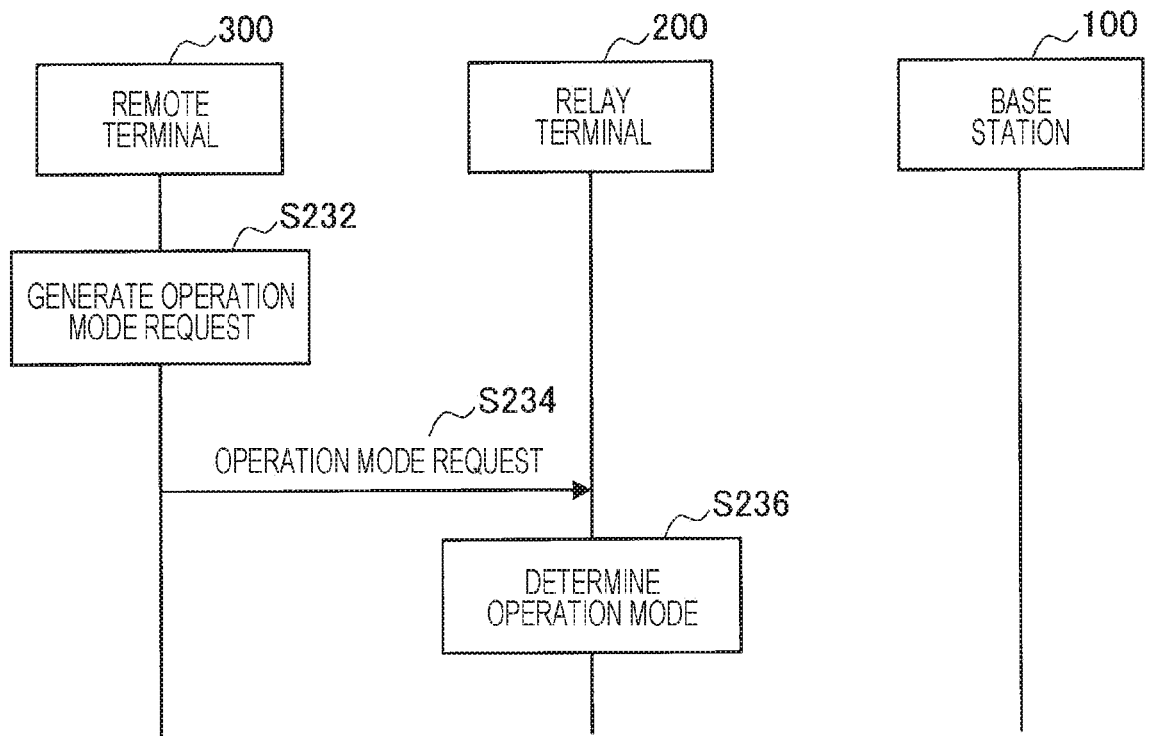
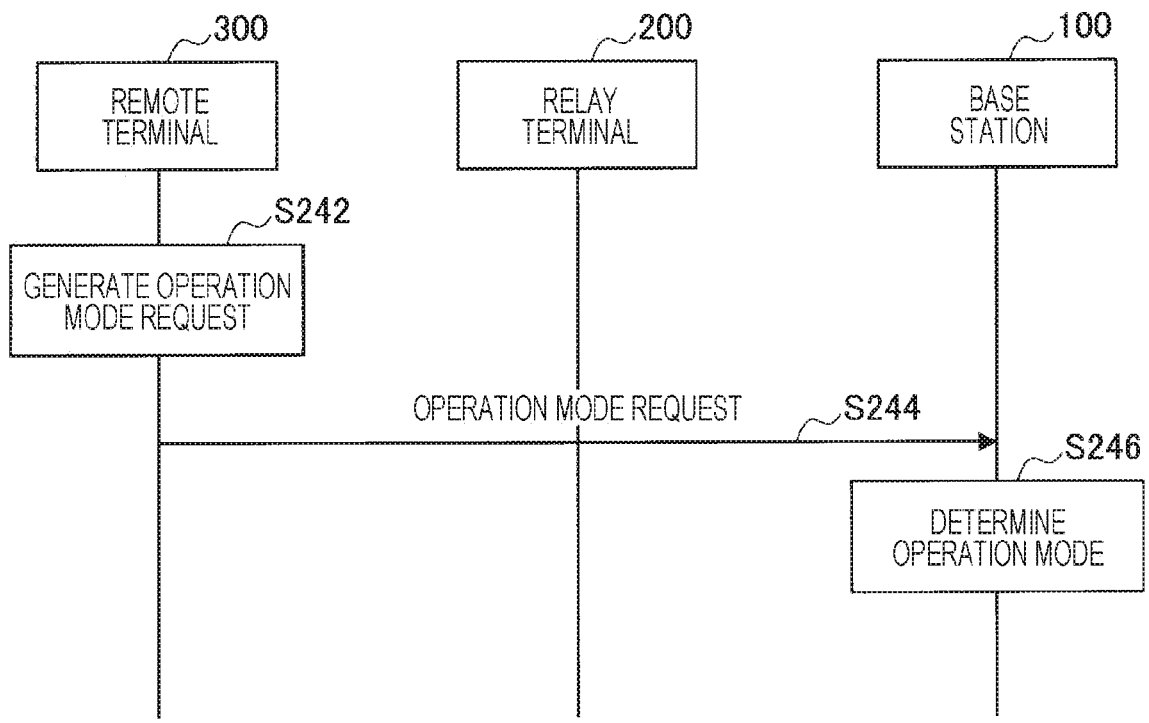

RELAY COMMUNICATION DEVICE, BASE STATION, METHOD, AND RECORDING MEDIUM

CROSS REFERENCE TO RELATED APPLICATIONS

This application is a U.S. National Phase of International Patent Application No. PCT/JP2017/044963 filed on Dec. 14, 2017, which claims priority benefit of Japanese Patent Application No. JP 2017-018271 filed in the Japan Patent Office on Feb. 3, 2017. Each of the above-referenced applications is hereby incorporated herein by reference in its entirety.

TECHNICAL FIELD

The present disclosure relates to a relay communication device, a base station, a method, and a recording medium.

BACKGROUND ART

In recent years, development related to internet of things (IoT) has been actively conducted. In IoT, wireless communication is an important technology theme since various items are connected to a network to exchange information. Therefore, in the 3rd generation partnership project (3GPP), communication for IoT that realizes small packets, low power consumption, or low cost, such as machine type communication (MTC) and narrow band IoT (NB-IoT), has been standardized.

In communication for IoT, it is desirable to ensure wide coverage with lowest power consumption as possible. However, there is typically a trade-off relation between power consumption and coverage, and ensuring wide coverage inevitably causes an increase in power consumption. Therefore, as one of techniques for achieving both low power consumption and wide coverage, relaying of communication by a relay terminal is being studied.

For example, Patent Document 1 below discloses a technique in which a terminal device in a cell relays communication between a terminal device outside the cell and a base station.

CITATION LIST

Patent Document

Patent Document 1: Japanese Patent Application Laid-Open No. 2016-96489

SUMMARY OF THE INVENTION

Problems to be Solved by the Invention

A communication status between the relay terminal providing the relay and the remote terminal receiving the relay may change. However, in Patent Document 1 and the like, a change in the communication status between the relay terminal and the remote terminal is not assumed, and it is difficult to appropriately cope with the change in the communication status.

Thus, the present disclosure provides a system capable of realizing adaptive relay communication according to a communication status between a relay terminal and a remote terminal.

Solutions to Problems

The present disclosure provides a relay communication device that is made movable and relays communication between a base station and a remote terminal, and the relay communication device includes a determination unit configured to determine a parameter set on the basis of information indicating a communication status related to distance or traffic between the relay communication device and the remote terminal, the parameter set being settable regarding communication between the relay communication device and the remote terminal, and a notification unit configured to notify the remote terminal of information indicating a determination result by the determination unit.

Furthermore, the present disclosure provides a base station that is communicable with a remote terminal via a relay of communication by a movable relay communication device, and the base station includes a determination unit configured to determine a parameter set on the basis of information indicating a communication status related to distance or traffic between the relay communication device and the remote terminal, the parameter set being settable regarding communication between the relay communication device and the remote terminal, and a notification unit configured to notify the relay communication device and the remote terminal of information indicating a determination result by the determination unit.

Furthermore, the present disclosure provides a method executed by a relay communication device that is made movable and relays communication between a base station and a remote terminal, and the method includes determining a parameter set on the basis of information indicating a communication status related to distance or traffic between the relay communication device and the remote terminal, the parameter set being settable regarding communication between the relay communication device and the remote terminal, and notifying the remote terminal of information indicating a determination result.

Furthermore, the present disclosure provides a method executed by a base station that is communicable with a remote terminal via a relay of communication by a movable relay communication device, and the method includes determining a parameter set on the basis of information indicating a communication status related to distance or traffic between the relay communication device and the remote terminal, the parameter set being settable regarding communication between the relay communication device and the remote terminal, and notifying the relay communication device and the remote terminal of information indicating a determination result.

Furthermore, the present disclosure provides a recording medium storing a program that causes a computer in a relay communication device, the relay communication device being made movable and relaying communication between a base station and a remote terminal, to function as a determination unit configured to determine a parameter set on the basis of information indicating a communication status related to distance or traffic between the relay communication device and the remote terminal, the parameter set being settable regarding communication between the relay communication device and the remote terminal, and a notification unit configured to notify the remote terminal of information indicating a determination result by the determination unit.

Furthermore, the present disclosure provides a recording medium storing a program that causes a computer in a base station, the base station being communicable with a remote terminal via a relay of communication by a movable relay communication device, to function as a determination unit configured to determine a parameter set on the basis of information indicating a communication status related to distance or traffic between the relay communication device and the remote terminal, the parameter set being settable regarding communication between the relay communication device and the remote terminal, and a notification unit configured to notify the relay communication device and the remote terminal of information indicating a determination result by the determination unit.

According to the present disclosure, a parameter set, which can be set related to communication between the relay terminal and the remote terminal, is determined on the basis of information indicating a communication status related to distance or traffic between the relay terminal (corresponding to the relay communication device) and the remote terminal. With this configuration, the relay terminal and the remote terminal can perform relay communication using an appropriate parameter according to the communication status between the relay terminal and the remote terminal.

Effects of the Invention

As described above, according to the present disclosure, the present disclosure provides a system capable of realizing adaptive relay communication according to a communication status between a relay terminal and a remote terminal. Here, the above described effect should not be limited, and there may be any one of the effects described in this specification or other effects that can be generated on the basis of the present specification in addition to the above described effects, together with the above mentioned effects, or as a substitute for the above mentioned effects.

BRIEF DESCRIPTION OF DRAWINGS

FIG. 2 is a diagram for explaining an example of an operation environment of FeD2D.

FIG. 8 is a flow chart illustrating an example of a schematic flow of communication processing executed in a system according to the present embodiment.

FIG. 9 is a sequence diagram illustrating an example of a flow of an operation environment recognition process and an operation mode determination process executed in the system according to the present embodiment.

FIG. 10 is a sequence diagram illustrating an example of the flow of the operation environment recognition process and the operation mode determination process executed in the system according to the present embodiment.

FIG. 11 is a sequence diagram illustrating an example of the flow of the operation environment recognition process and the operation mode determination process executed in the system according to the present embodiment.

FIG. 12 is a sequence diagram illustrating an example of the flow of the operation environment recognition process and the operation mode determination process executed in the system according to the present embodiment.

FIG. 13 is a sequence diagram illustrating an example of the flow of the operation environment recognition process and the operation mode determination process executed in the system according to the present embodiment.

MODE FOR CARRYING OUT THE INVENTION

Figure 1:
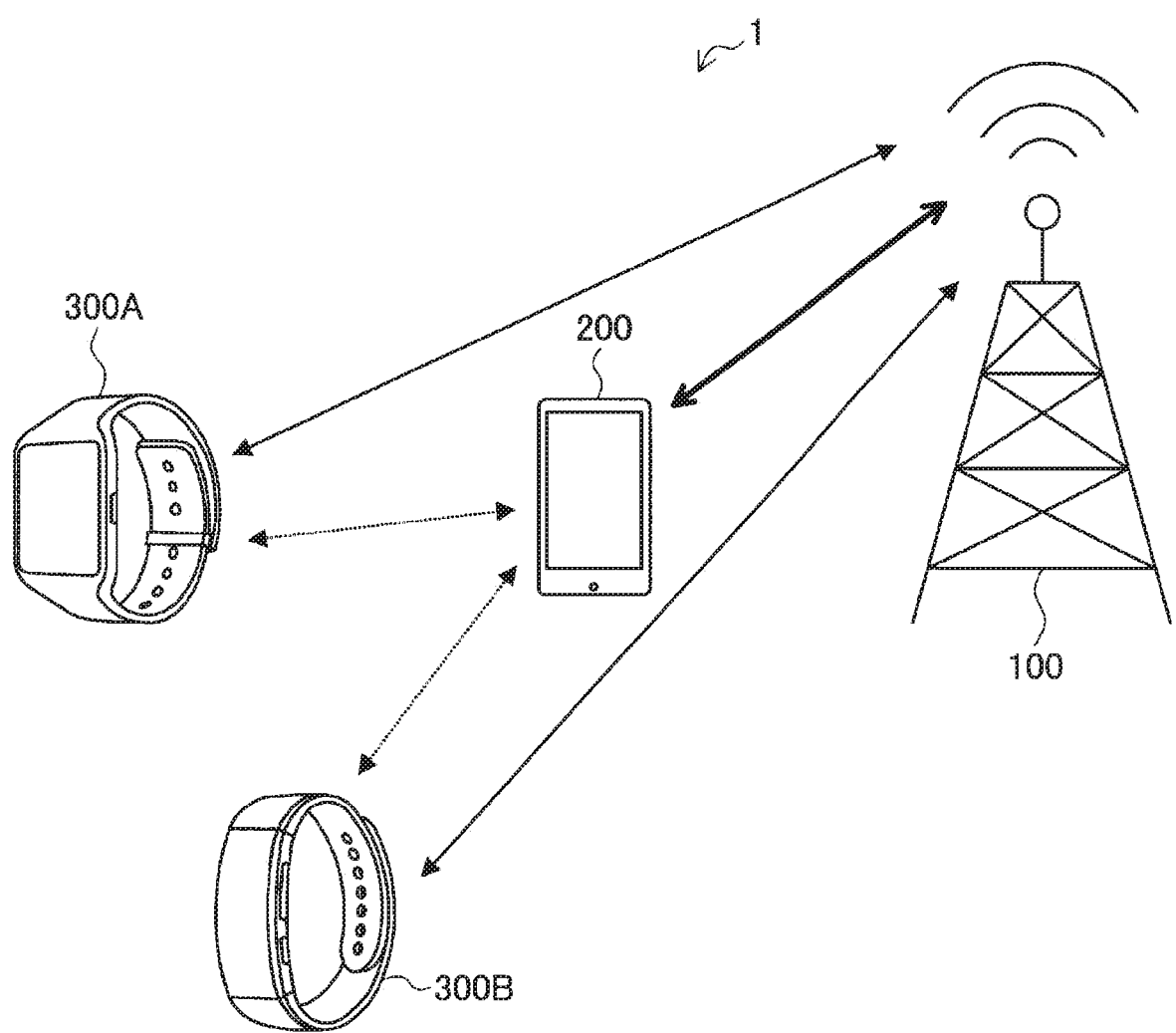
FIG. 1 is a diagram for explaining an example of a configuration of a system according to an embodiment of the present disclosure.

Preferred embodiments of the present disclosure will be described in detail below with reference to the accompanying drawings. Here, in the present specification and the drawings, same reference numerals are given to constituent elements having substantially same functional configuration, and redundant explanation will be omitted.

Note that the description will be given in the following order.

1. Introduction
1.1. Overall configuration
1.2. Demands related to relay communication
1.3. FeD2D operation environment
2. Configuration example of each device
2.1. Configuration example of base station
2.2. Configuration example of relay terminal
2.3. Configuration example of remote terminal
2.4. Configuration example of operation mode determination processing unit
3. Technical features
3.1. Processing flow
3.2. Information indicating communication status of relay communication
3.3. Determination of operation mode
3.4. Parameter setting for relay communication
4. Application examples
5. Conclusion 1. Introduction 1.1. Overall Configuration FIG. 1 is a diagram for explaining a configuration example of a system 1 according to an embodiment of the present disclosure. As illustrated in FIG. 1, the system 1 according to the present embodiment includes a base station 100, a terminal device 200, and terminal devices 300 (300A and 300B).

The base station 100 operates a cell and provides wireless service to one or more terminal devices located inside the cell. For example, the base station 100 provides wireless service to each of the terminal devices 200 and 300. The cell may be operated according to any wireless communication scheme such as LTE or new radio (NR), for example.

The terminal device 200 and the terminal device 300 wirelessly communicate with the base station 100 on the basis of control by the base station 100. The terminal device 200 and the terminal device 300 may be so-called user terminal (user equipment: UE). The terminal device 200 and the terminal device 300 form a link (for example, a downlink or an uplink) with the base station 100. Then, the terminal device 200 and the terminal device 300 transmit an uplink signal to the base station 100 and receive a downlink signal from the base station 100. In this manner, communicating with the base station 100 without passing through another device is also referred to as direct communication.

Here, the terminal device 200 is a movable relay communication device having a function of connecting (relaying, in another word) communication to or from another device. For example, the terminal device 200 can relay communication between the base station 100 and the terminal device 300. In other words, the base station 100 can communicate with the terminal device 300 via a communication relay by the terminal device 200. More specifically, the terminal device 200 receives an uplink signal addressed to the base station 100 from the terminal device 300, transfers the signal to the base station 100, and receives a downlink signal addressed to the terminal device 300 from the base station 100 and transfers the signal to the terminal device 300. In this manner, communicating with the base station 100 via another device is also referred to as relay communication. The terminal device 300 can perform communication with low power consumption by using the relay communication, typically compared to direct communication. A link formed between the terminal device 200 and the terminal device 300 is also referred to as a sidelink. Furthermore, a link formed between the base station 100 and the terminal device 200 is also referred to as a backhaul link. Note that, although FIG. 1 illustrates an example in which a single terminal device 200 performs relay communication, two or more terminal devices 200 may perform relay communication.

Hereinafter, the movable terminal device 200 having a relay function is also referred to as a relay terminal, and the terminal device 300 communicating via the relay terminal 200 is also referred to as a remote terminal. The relay terminal may also be referred to as Relay UE. The remote terminal 300 is, for example, an IoT device that performs infrequent communication. In addition, the remote terminal 300 may be a smartphone, an on-vehicle terminal, a drone, or the like. The relay terminal 200 may also be similarly realized as, for example, a device dedicated to relays, an IoT device, a smartphone, an on-vehicle terminal, or a drone.

As an apparatus similar to the relay terminal, there is a relay base station. The relay base station has been standardized in 3GPP. Hereinafter, a difference between the relay base station and the relay terminal will be described.

First, there is a difference related to mobility. The relay base station is fixed in a position. In contrast, the relay terminal has mobility.

Second, there is a difference related to an owner. The relay base station is typically owned by an operator and operates with same authority as in the base station. In contrast, the relay terminal is typically owned by a user and may operate with limited privileges compared to the relay base station. For example, the relay terminal may operate under management by the base station.

Third, there is a difference related to possible use cases. The relay base station is assumed to provide relay communication to a smartphone. On the other hand, the relay terminal is assumed to provide relay communication to an MTC terminal and an NB-IoT terminal in addition to a smart phone, and is required to support various communication traffic including small packet data.

Fourth, there is a difference related to deployment of the remote terminal. Regarding the relay base station, it is assumed that remote terminals are uniformly distributed in its coverage. On the other hand, regarding the relay terminal, the remote terminals are not necessarily uniformly distributed.

Fifth, there is a difference in physical restrictions between the relay base station and the relay terminal. Since the relay terminal has a limited mounting space, it is difficult to implement a same function as the relay base station. Therefore, it is desirable that the relay terminal operates with support of the base station.

1.2. Demands Related to Relay Communication

There is a wearable terminal as a typical example of the IoT terminal that uses relay communication. A wearable terminal is required to have low power consumption and high reliability communication, and sometimes have a large capacity communication. In order to cover such a use case, standardization of further enhancement D2D (FeD2D) has started in 3GPP in 2016. Wearable terminals typically exist around the user. Therefore, by receiving provision of relay communication from a user equipment such as a smart phone, the wearable terminal can shorten communication distance and realize highly reliable communication with low power consumption.

In relay communication for such wearable terminals, since guaranteeing end-to-end quality of service (QoS) between the base station and the remote terminal is important, a highly reliable communication path is desirable. Furthermore, in a case where the wearable terminal is a remote terminal, the relay communication with low complexity, low cost, and low power consumption is desirable. In order to realize these, the implementation of the following demands is needed.

A first demand is the improvement of sidelink communication. In the sidelink, closed loop feedback communication for performing retransmission and the like is not performed. However, in order to satisfy the first demand, it is desirable that functions such as link adaptation using feedback and hybrid automatic repeat request (HARQ) are supported in order to realize, for example, QoS and highly reliable communication.

A second demand is to reduce power consumption. In order to meet the second requirement, it is desirable that functions such as transmission power control and discontinuous reception (DRX) are supported.

A third demand is service continuity. For a wearable terminal, the link quality changes dynamically. Therefore, in order to satisfy the third demand, it is desirable that functions such as handover and path switching optimization are supported.

1.3. Operation Environment of FeD2D

Next, the operation environment of FeD2D will be described. The FeD2D operation environment has characteristics related to distance and traffic.

Distance

FIG. 2 is a diagram for explaining an example of an operation environment of FeD2D. As illustrated in FIG. 2, the FeD2D operation environment includes a short range communication environment indicated by the reference numeral 11 and a wide range communication environment indicated by the reference numeral 12.

In the short range communication environment indicated by the reference numeral 11, both the relay terminal 200 and the remote terminal 300 are attached to or carried by a user, and are stably located in a short distance. On the other hand, in the long range communication environment indicated by reference numeral 12, the relay terminal 200 is attached to or carried by the user, while the remote terminal 300 is placed far from the user. Here, the remote terminal 300 in the long range communication environment indicated by reference numeral 12 is a car. A device which is not worn by the user, such as a car, may also be considered a wearable terminal.

In this manner, the distance between the relay terminal 200 and the remote terminal 300 is not always constant. Therefore, it is desirable that relay communication is supported in both short range communication environment and long range communication environment.

Traffic

As a terminal device assumed as the remote terminal 300, there is a device that requires a high data rate or a device that communicates a very small amount of data packets such as unlocking a car key, for example. Therefore, it is desirable that a wide range of traffic volume variation is supported in relay communication.

Relay Communication According to FeD2D Operation Environment

As described above, with FeD2D, there are wide variations in communication distance and traffic. Therefore, in relay communication, it is desirable that appropriate communication is provided according to such operation environments.

For example, in a sidelink in relay communication, it may be desirable to support functions such as link adaptation using feedback, HARQ, and the like in order to secure QoS and reliability. However, it can be said that these functions are not needed to be supported in an environment, for example, where the communication distance is stable and very short and a very small amount of packets are transmitted and received.

Therefore, in the following, a mechanism capable of providing appropriate relay communication according to the operation environment will be provided.

2. Configuration Example of Each Device

2.1. Configuration Example of Base Station

Figure 3:
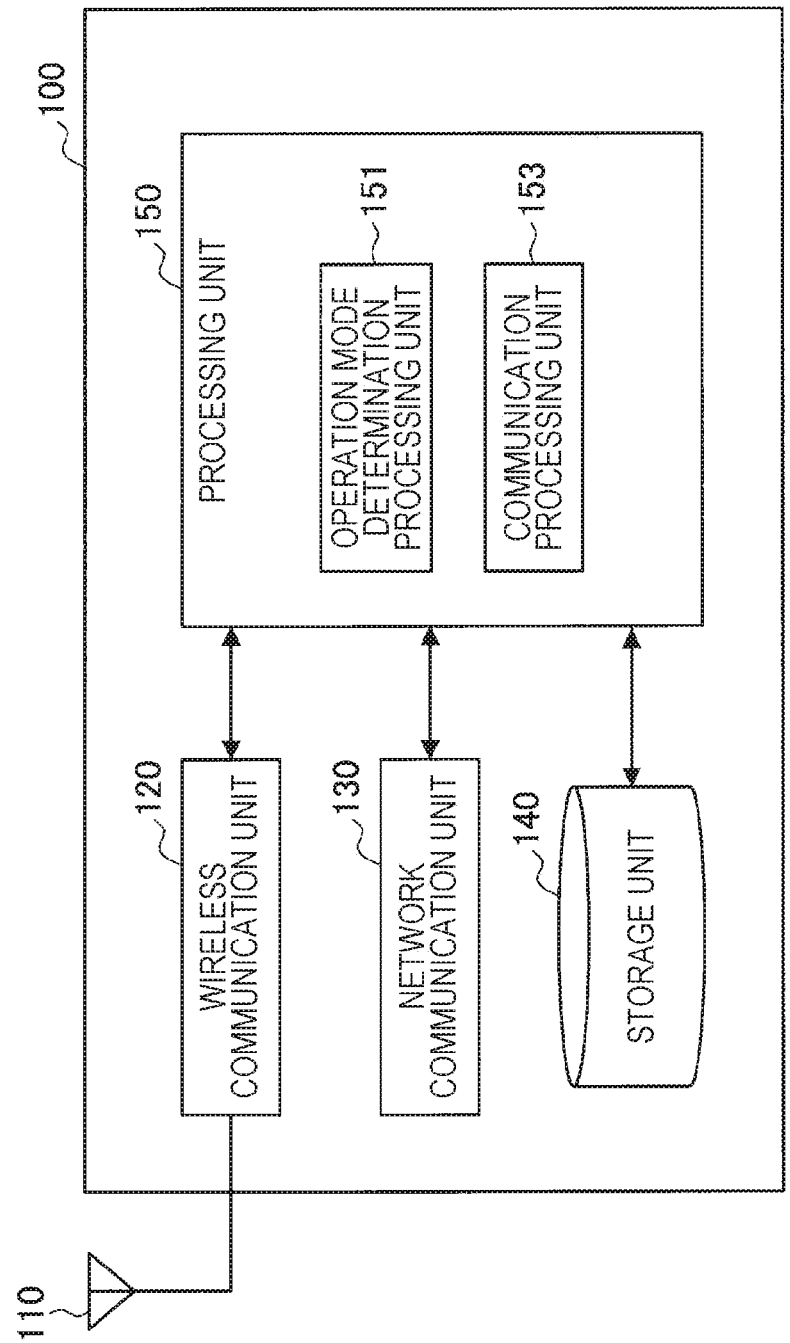
FIG. 3 is a block diagram illustrating an example of a configuration of a base station according to the present embodiment.

FIG. 3 is a block diagram illustrating an example of a configuration of the base station 100 according to the present embodiment. Referring to FIG. 3, the base station 100 includes an antenna unit 110, a wireless communication unit 120, a network communication unit 130, a storage unit 140, and a processing unit 150.

(1) Antenna Unit 110

The antenna unit 110 radiates a signal output from the wireless communication unit 120 into space as a radio wave. In addition, the antenna unit 110 converts the radio wave in space into a signal, and outputs the signal to the wireless communication unit 120.

(2) Wireless Communication Unit 120

The wireless communication unit 120 transmits and receives signals. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from the another node. For example, the another node includes another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes an operation mode determination unit 151 and a communication processing unit 153. The operation mode determination unit 151 performs processing for determining an operation mode. The communication processing unit 153 performs communication processing using a parameter corresponding to the determined operation mode. Note that the processing unit 150 may further include other components in addition to these components. In other words, the processing unit 150 can also perform operations other than the operations of these components.

2.2. Configuration Example of Relay Terminal

Figure 4:
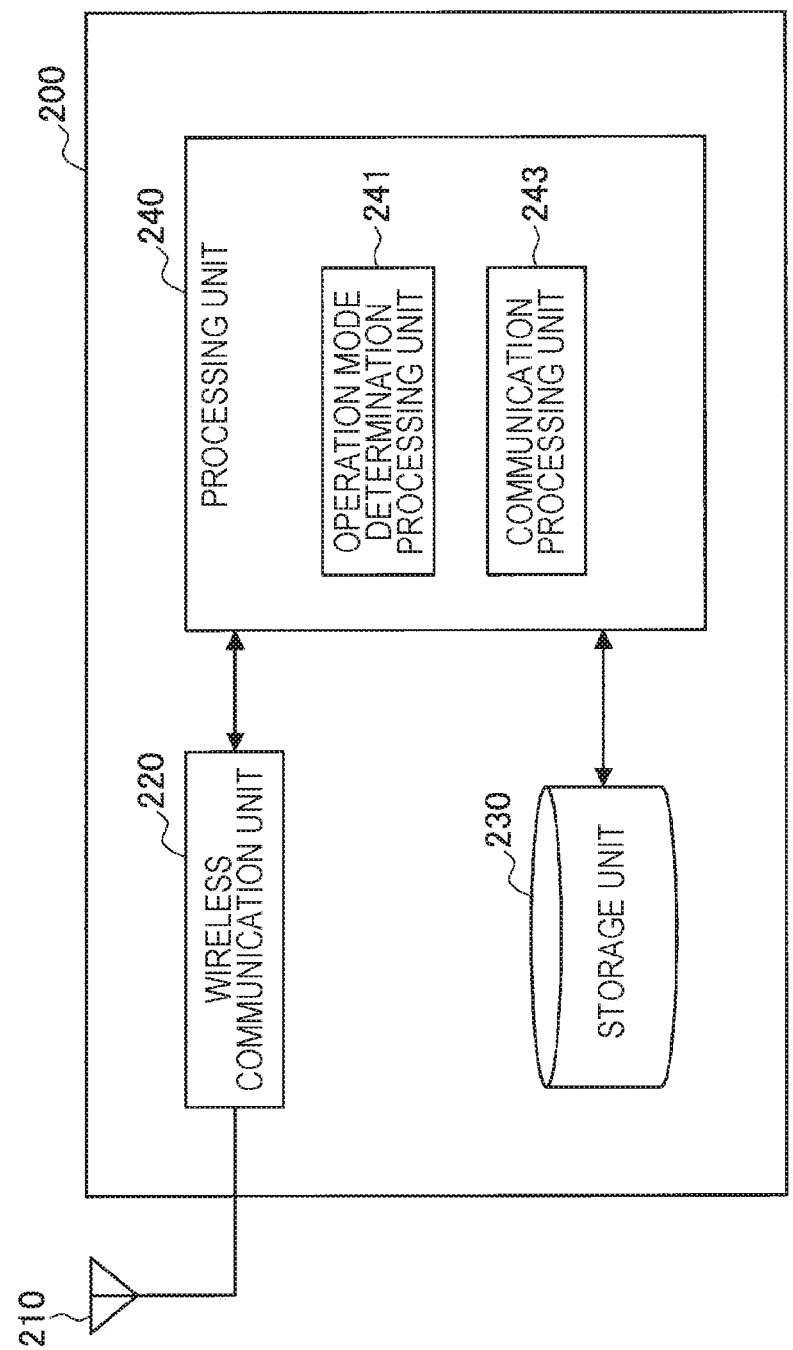
FIG. 4 is a block diagram illustrating an example of a configuration of a relay terminal according to the present embodiment.

FIG. 4 is a block diagram illustrating an example of a configuration of the relay terminal 200 according to the present embodiment. Referring to FIG. 4, the relay terminal 200 includes an antenna unit 210, a wireless communication unit 220, a storage unit 230, and a processing unit 240.

(1) Antenna Unit 210

The antenna unit 210 radiates a signal output from the wireless communication unit 220 into space as a radio wave. Also, the antenna unit 210 converts the radio wave in space into a signal, and outputs the signal to the wireless communication unit 220.

(2) Wireless Communication Unit 220

The wireless communication unit 220 transmits and receives a signal. For example, the wireless communication unit 220 receives a downlink signal from a base station and transmits an uplink signal to the base station.

According to the present embodiment, the wireless communication unit 220 transmits an uplink signal, which is addressed to the base station 100, to the base station 100 or the relay terminal 200, and receives a downlink signal, which is sent from the base station 100, from the base station 100 or the relay terminal 200.

According to the present embodiment, the wireless communication unit 220 receives, from the remote terminal 300, an uplink signal addressed to the base station 100, transfers the signal to the base station 100, and receives, from the base station 100, a downlink signal addressed to the remote terminal 300 and transfers the signal to the remote terminal 300.

(3) Storage Unit 230

The storage unit 230 temporarily or permanently stores a program and various data for the operation of the relay terminal 200.

(4) Processing Unit 240

The processing unit 240 provides various functions of the relay terminal 200. The processing unit 240 includes an operation mode determination unit 241 and a communication processing unit 243. The operation mode determination unit 241 performs a process to determine an operation mode. The communication processing unit 243 performs communication processing using a parameter corresponding to the determined operation mode. Here, the processing unit 240 may further include another component in addition to the above components. In other words, the processing unit 240 can perform operation in addition to the operation of these components.

2.3. Configuration Example of Remote Terminal

Figure 5:
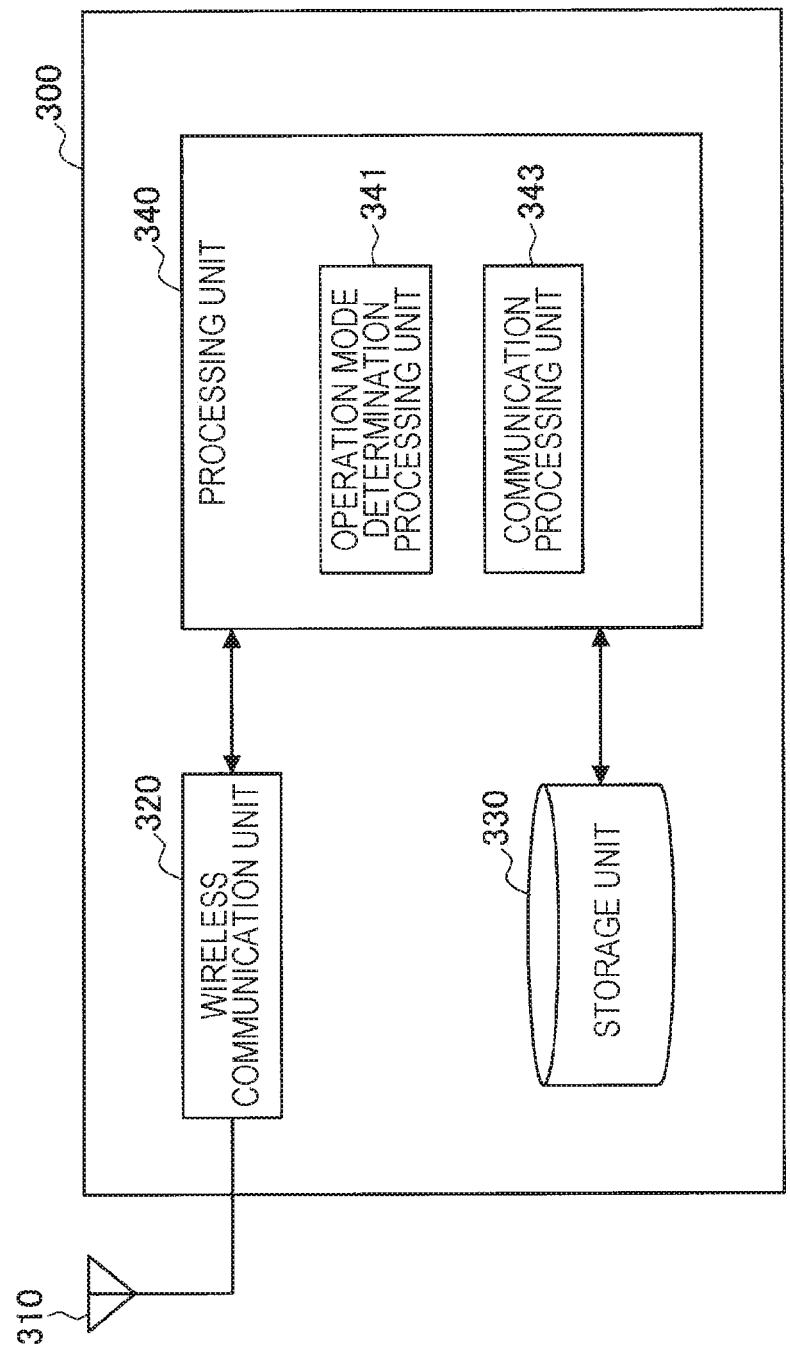
FIG. 5 is a block diagram illustrating an example of a configuration of a remote terminal according to the present embodiment.

FIG. 5 is a block diagram illustrating an example of a configuration of the remote terminal 300 according to the present embodiment. According to FIG. 5, the remote terminal 300 includes an antenna unit 310, a wireless communication unit 320, a storage unit 330, and a processing unit 340.

(1) Antenna Unit 310

The antenna unit 310 radiates a signal output from the wireless communication unit 320 into space as a radio wave. Furthermore, the antenna unit 310 converts the radio wave in the space into a signal, and outputs the signal to the wireless communication unit 320.

(2) Wireless Communication Unit 320

The wireless communication unit 320 transmits and receives signals. For example, the wireless communication unit 320 receives a downlink signal from a base station and transmits an uplink signal to the base station.

According to the present embodiment, the wireless communication unit 320 transmits an uplink signal, which is addressed to the base station 100, to the base station 100 or the relay terminal 200, and receives a downlink signal, which is sent from the base station 100, from the base station 100 or the relay terminal 200.

(3) Storage Unit 330

The storage unit 330 temporarily or permanently stores a programs and various data for the operation of the remote terminal 300.

(4) Processing Unit 340

The processing unit 340 provides various functions of the remote terminal 300. The processing unit 340 includes an operation mode determination unit 341 and a communication processing unit 343. The operation mode determination unit 341 performs a process to determine an operation mode. The communication processing unit 343 performs communication processing using a parameter corresponding to the determined operation mode. Note that the processing unit 340 may further include other components in addition to the above components. In other words, the processing unit 340 can also perform operation in addition to the operation of the above components.

2.4. Configuration Example of Operation Mode Determination Processing Unit

Each of the operation mode determination units 151, 241, and 341 described above is either a master type that determines the operation mode by itself or a slave type that supports the determination by the master type without determining the operation mode by itself. Configuration examples of a master-type operation mode determination unit and a slave-type operation mode determination unit will be described with reference to FIGS. 6 and 7.

Figure 6:
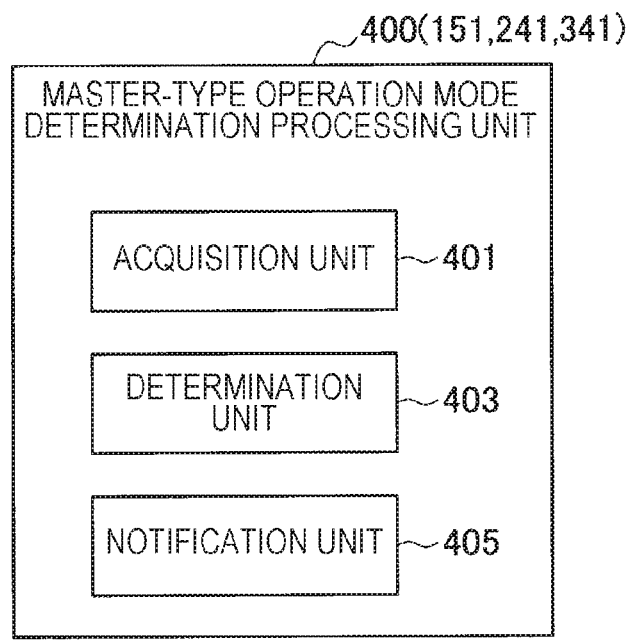
FIG. 6 is a block diagram illustrating an example of a configuration of a master-type operation mode determination unit according to the present embodiment.

FIG. 6 is a block diagram illustrating an example of the configuration of the master-type operation mode determination unit according to the present embodiment. As illustrated in FIG. 6, the master-type operation mode determination unit 400 includes an acquisition unit 401, a determination unit 403, and a notification unit 405. The acquisition unit 401 acquires information indicating a communication status of relay communication via communication by itself or from a slave-type device. The determination unit 403 determines an operation mode (in other words, a parameter set that can be set for relay communication) on the basis of the acquired information indicating the communication status of the relay communication. The notification unit 405 notifies the slave device of information indicating the determination result by the determination unit 403.

Figure 7:
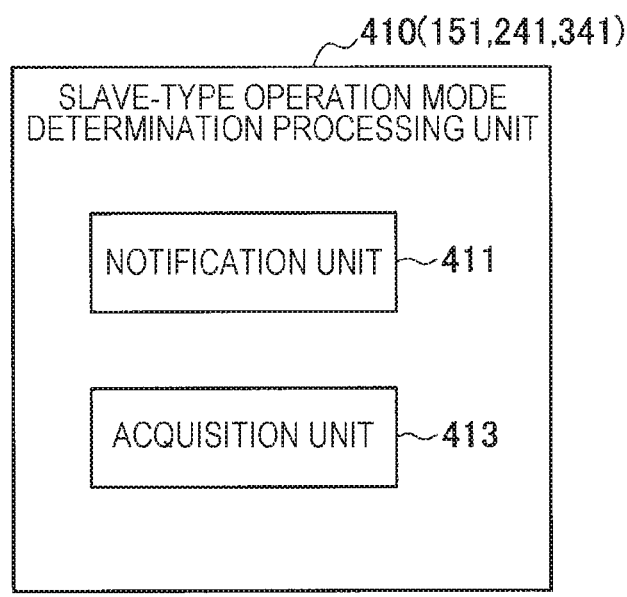
FIG. 7 is a block diagram illustrating an example of a configuration of a slave-type operation mode determination unit according to the present embodiment.

FIG. 7 is a block diagram illustrating an example of the configuration of the slave-type operation mode determination unit according to the present embodiment. As illustrated in FIG. 7, the slave-type operation mode determination unit 410 includes a notification unit 411 and an acquisition unit 413. The notification unit 411 acquires information indicating the communication status of the relay communication, and notifies the master-type device of the information. The acquisition unit 413 acquires information indicating the determination result by the master-type device.

Note that, hereinafter, a device (base station 100, relay terminal 200, or remote terminal 300) having the master-type operation mode determination unit 400 is also referred to as a master-type device. Furthermore, a device (base station 100, relay terminal 200 or remote terminal 300) including the slave-type operation mode determination unit 410 is also referred to as a slave-type device.

3. Technical Features

3.1. Processing Flow (1) Overview

FIG. 8 is a flowchart illustrating an example of a schematic flow of a communication process executed in the system 1 according to the present embodiment.

As illustrated in FIG. 8, first, the system 1 recognizes the operation environment (step S102). Next, the system 1 determines an operation mode on the basis of recognized operation environment (step S104). Next, the system 1 controls a parameter related to relay communication according to the determined operation mode (step S106). Then, the system 1 performs communication using the controlled parameter (step S108). With this configuration, the process ends.

(2) Details

The communication process executed in the system 1 has variations according to which of the base station 100, the relay terminal 200, and the remote terminal 300 is a master type and which is a slave type. First, with reference to FIGS. 9 to 14, the variations of an operation environment recognition process and an operation mode determination process (steps S102 and S104 in FIG. 8) will be described. Here, communication between the base station 100 and the remote terminal 300 in the sequence described below may be direct communication or relay communication.

First Example

FIG. 9 is a sequence diagram illustrating an example of the flow of the operation environment recognition process and operation mode determination process executed in the system 1 according to the present embodiment. As illustrated in FIG. 9, the base station 100, the relay terminal 200, and the remote terminal 300 are involved in this sequence. In this example, the relay terminal 200 is the master type, and the base station 100 and the remote terminal 300 are the slave type.

First, each of the base station 100 and the remote terminal 300 acquires information indicating the communication status of relay communication (step S202), and transmits the information to the relay terminal 200 (step S204). Next, the relay terminal 200 determines the operation mode on the basis of the information indicating the communication status of the relay communication acquired from each of the base station 100 and the remote terminal 300 (step S206).

Second Example

FIG. 10 is a sequence diagram illustrating an example of the flow of an operation environment recognition process and an operation mode determination process executed in the system 1 according to the present embodiment. As illustrated in FIG. 10, the base station 100, the relay terminal 200, and the remote terminal 300 are involved in this sequence. In this example, the base station 100 is a master type, and the relay terminal 200 and the remote terminal 300 are slave types.

First, each of the relay terminal 200 and the remote terminal 300 acquires information indicating the communication status of relay communication (step S212), and transmits the information to the base station 100 (step S214). Next, the base station 100 determines an operation mode on the basis of the information indicating the communication status of the relay communication acquired from each of the relay terminal 200 and the remote terminal 300 (step S216).

Third Example

FIG. 11 is a sequence diagram illustrating an example of a flow of the operation environment recognition process and the operation mode determination process executed in the system 1 according to the present embodiment. As illustrated in FIG. 11, the base station 100, the relay terminal 200, and the remote terminal 300 are involved in this sequence. In this example, the remote terminal 300 is the master type, and the base station 100 and the relay terminal 200 are the slave type.

First, each of the base station 100 and the relay terminal 200 acquires information indicating the communication status of relay communication (step S222), and transmits the information to the remote terminal 300 (step S224). Next, the remote terminal 300 determines the operation mode on the basis of the information indicating the communication status of the relay communication acquired from each of the base station 100 and the relay terminal 200 (step S226).

The above described first to third examples are examples in which the master-type device collects information from each slave-type device to determine the operation mode. Besides this, the master type may determine the operation mode in response to a request from the slave type.

Fourth Example

FIG. 12 is a sequence diagram illustrating an example of a flow of the operation environment recognition process and the operation mode determination process executed in the system 1 according to the present embodiment. As illustrated in FIG. 12, the base station 100, the relay terminal 200, and the remote terminal 300 are involved in this sequence. In this example, the relay terminal 200 is a master type, and the remote terminal 300 is a request source.

First, the remote terminal 300 generates an operation mode request (step S232), and transmits the operation mode request to the relay terminal 200 (step S234). Here, the operation mode request is information for requesting determination of the operation mode. Next, the relay terminal 200 determines an operation mode on the basis of the operation request acquired from the remote terminal 300 (step S236).

Fifth Example

FIG. 13 is a sequence diagram illustrating an example of the flow of the operation environment recognition process and the operation mode determination process executed in the system 1 according to the present embodiment. As illustrated in FIG. 13, the base station 100, the relay terminal 200, and the remote terminal 300 are involved in this sequence. In this example, the base station 100 is a master type, and the remote terminal 300 is a request source.

First, the remote terminal 300 generates an operation mode request (step S242), and transmits the operation mode request to the base station 100 (step S244). Next, the base station 100 determines an operation mode on the basis of the operation request acquired from the remote terminal 300 (step S246).

Sixth Example

Figure 14:
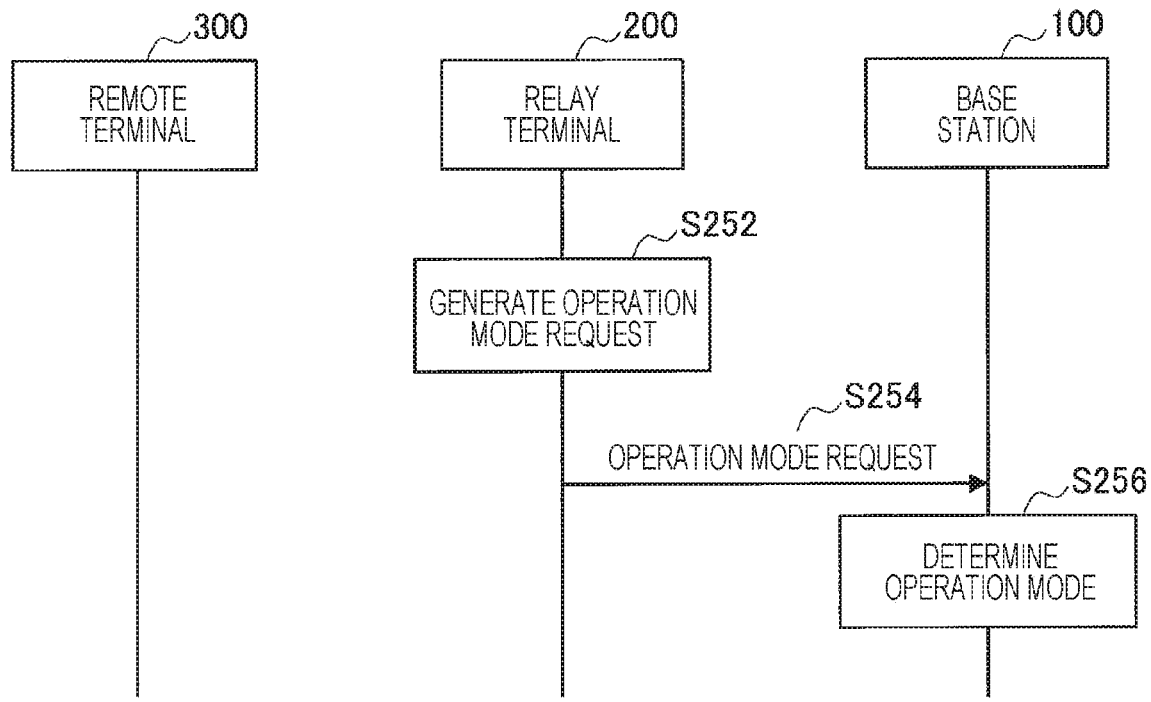
FIG. 14 is a sequence diagram illustrating an example of the flow of the operation environment recognition process and the operation mode determination process executed in the system according to the present embodiment.

FIG. 14 is a sequence diagram illustrating an example of the flow of an operation environment recognition process and an operation mode determination process executed in the system 1 according to the present embodiment. As illustrated in FIG. 14, the base station 100, the relay terminal 200, and the remote terminal 300 are involved in this sequence. In this example, the base station 100 is a master type, and the relay terminal 200 is a request source.

First, the relay terminal 200 generates an operation mode request (step S252), and transmits the operation mode request to the base station 100 (step S254). Next, the base station 100 determines an operation mode on the basis of the operation request acquired from the relay terminal 200 (step S256).

In the above, the variation regarding operation environment recognition process and operation mode determination process has been explained. Subsequently, a variation of the parameter control process (step S106 in FIG. 8) will be described with reference to FIGS. 15 and 16.

Seventh Example

Figure 15:
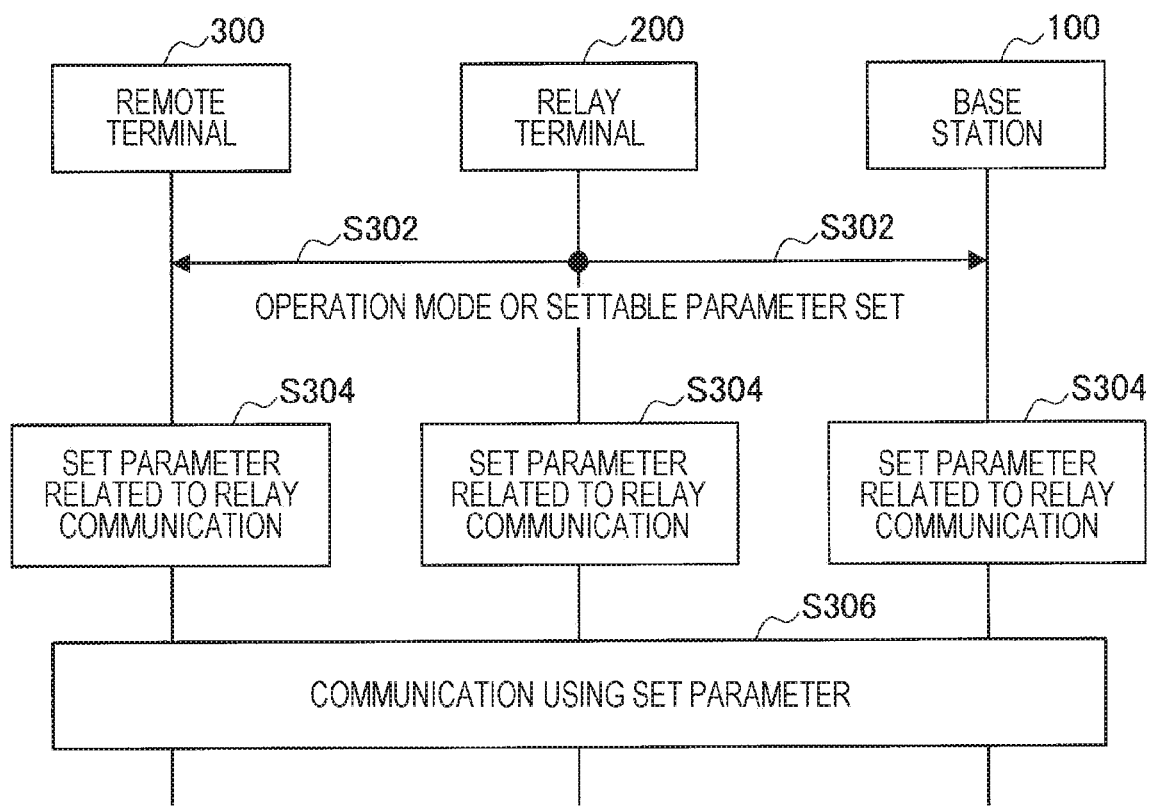
FIG. 15 is a sequence diagram illustrating an example of a flow of a parameter control process executed in the system according to the present embodiment.

FIG. 15 is a sequence diagram illustrating an example of a flow of the parameter control process executed in the system 1 according to the present embodiment. As illustrated in FIG. 15, the base station 100, the relay terminal 200, and the remote terminal 300 are involved in this sequence. The present example is an example in which the relay terminal 200 is a parameter control entity.

First, the relay terminal 200 transmits the determined operation mode or a settable parameter set corresponding to the determined operation mode to each of the base station 100 and the remote terminal 300 (step S302). Next, each of the base station 100, the relay terminal 200, and the remote terminal 300 sets parameters related to relay communication on the basis of the determined or information given in notification (step S304). Then, the base station 100, the relay terminal 200, and the remote terminal 300 perform communication using the set parameters (step S306).

Eighth Example

Figure 16:
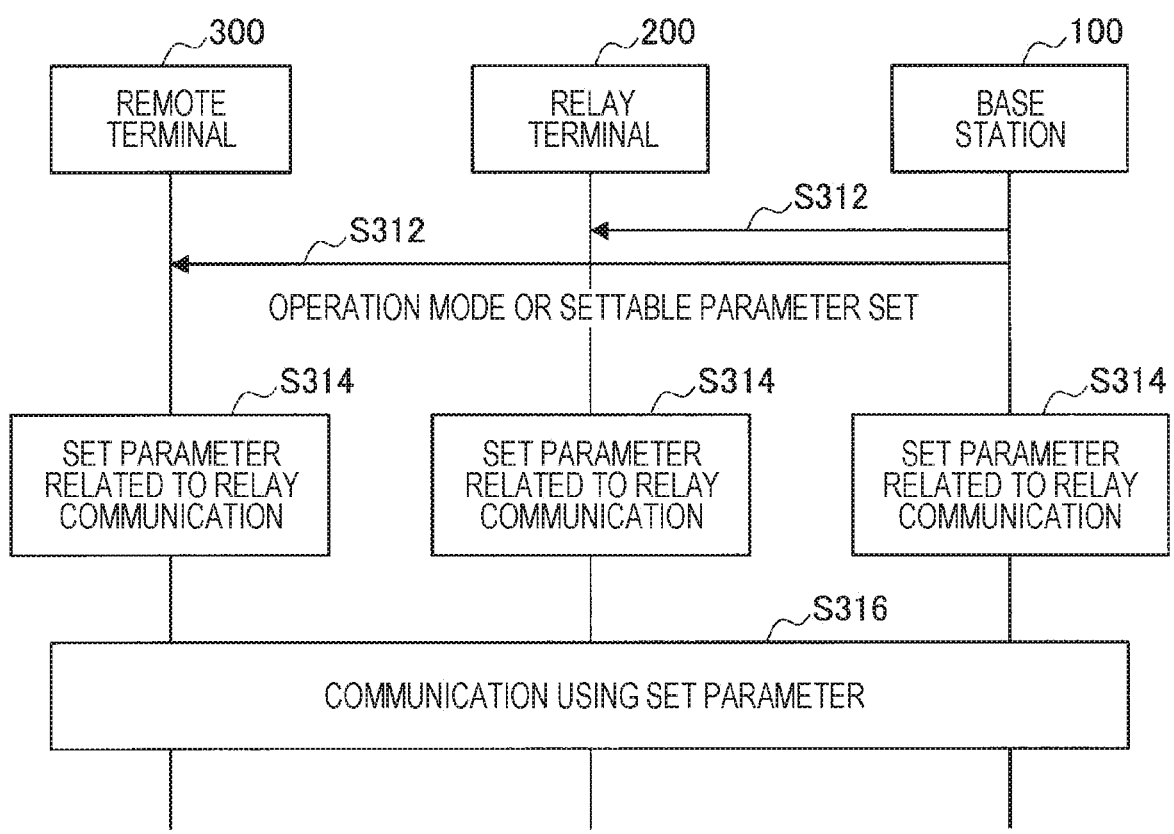
FIG. 16 is a sequence diagram illustrating an example of a flow of a transmission parameter control process executed in the system according to the present embodiment.

FIG. 16 is a sequence diagram illustrating an example of the flow of a transmission parameter control process performed in the system 1 according to the present embodiment. As illustrated in FIG. 16, the base station 100, the relay terminal 200, and the remote terminal 300 are involved in this sequence. This example is an example in which the base station 100 is the control entity of transmission parameters.

First, the base station 100 transmits a determined operation mode or a settable parameter set corresponding to the determined operation mode to each of the relay terminal 200 and the remote terminal 300 (step S312). Next, each of the base station 100, the relay terminal 200, and the remote terminal 300 sets parameters related to relay communication on the basis of the determined or information given in notification (step S314). Then, the base station 100, the relay terminal 200, and the remote terminal 300 perform communication using the set parameters (step S316).

In the above description, an example of the flow of the communication process performed in the system 1 according to the present embodiment has been described. In the following, various information and processes in the above described flowcharts or sequences will be described in detail.

3.2. Information Indicating Communication Status of Relay Communication

The slave-type device acquires information indicating a communication status of relay communication and notifies the master-type device of the information. The master-type device may also acquire information indicating the communication status of relay communication. The master-type device may acquire information indicating the communication status of relay communication from a device other than the slave-type device (for example, a device belonging to another network).

(1) Example of Information Indicating Communication Status of Relay Communication The information indicating a communication status of relay communication is information regarding at least one of distance or traffic between the relay terminal 200 and the remote terminal 300. The example will be described below.

Information Associated with Received Power of Sidelink

The information indicating a communication status of relay communication may include information associated with received power of the sidelink. Here, the sidelink is a link between the relay terminal 200 and the remote terminal 300, and the received power of the sidelink is the received power of the signal from the relay terminal 200 to the remote terminal 300, or the received power of the signal from the remote terminal 300 to relay terminal 200.

More specifically, the information associated with the received power of the sidelink is at least one of sidelink reference signal received power (S-RSRP) or sidelink reference signal received quality (S-RSRQ). These may be measured using a discovery signal, in which case the information associated with the received power of the sidelink will be sidelink discovery reference signal received power (SD-RSRP) or sidelink discovery reference signal received quality (SD-RSRQ). These measurements are performed by the relay terminal 200 or the remote terminal 300.

Furthermore, the information associated with the received power of the sidelink may include parameters related to averaging, filtering, and the like, which are used measure S-RSRP or S-RSRQ. The measurement may be performed at a preset fixed timing, or may be performed at a dynamic timing set by the base station 100 or the relay terminal 200. Furthermore, the measurement may be performed at timing according to the information indicating the acquired communication status of the relay communication. For example, availability may be determined on the basis of comparison between the acquired information indicating the communication status of relay communication and threshold information, and the threshold information may be set by the base station 100 or the relay terminal 200. Furthermore, the measurement may be performed at timing according to the operation mode. More specifically, the measurement may be performed at timing according to at least one of communication distance or traffic type.

Information Associated with Received Power of Downlink or Uplink

The information indicating a communication status of relay communication may include information associated with downlink or uplink received power. The downlink or uplink here is a link between the base station 100 and the remote terminal 300.

The information associated with downlink or uplink received power specifically includes at least one of RSRP or RSRQ. These measurements are performed by, for example, the base station 100 or the remote terminal 300.

Furthermore, the information associated with downlink or uplink received power may include a parameter related to averaging, filtering, and the like, which are used when measuring RSRP or RSRQ. This parameter is similar to that in the above described S-RSRP or S-RSRQ.

Information Associated with Received Power of Backhaul Link

The information indicating a communication status of relay communication may include information associated with received power of a backhaul link. The backhaul link here is a link between the base station 100 and the relay terminal 200.

More specifically, the information associated with the received power of the backhaul link includes at least one of RSRP or RSRQ. These measurements are performed by the base station 100 or the relay terminal 200.

Furthermore, the information associated with the received power of the backhaul link may include a parameter related to averaging, filtering, and the like, which are used when measuring RSRP or RSRQ. This parameter is similar to that in the above described S-RSRP or S-RSRQ.

Information Indicating Communication Channel Status

The information indicating a communication status of relay communication may include information indicating a communication channel status. Here, a communication channel is a communication channel between the relay terminal 200 and the remote terminal 300, a communication channel between the relay terminal 200 and the base station 100, or a communication channel between the base station 100 and the remote terminal 300.

More specifically, the information indicating the communication channel status may be a parameter related to the communication channel status. Furthermore, the information indicating the communication channel status may be a value calculated on the basis of a reference signal. Furthermore, the information indicating the communication channel status may include a parameter related to averaging, filtering, and the like, which are used when measuring the communication channel status. This parameter is similar to that in the above described S-RSRP or S-RSRQ.

Information Associated with Synchronization Source

The information indicating a communication status of relay communication may include information associated with a synchronization source of the relay terminal 200 or the remote terminal 300. The synchronization source here is, for example, a transmission source of a synchronization signal that the relay terminal 200 or the remote terminal 300 refers to for synchronization acquisition.

The information associated with the synchronization source may be, for example, that the synchronization source is the base station 100, that it is the relay terminal 200, that it is the remote terminal 300, or that it is another device such as a global navigation satellite system (GNSS) satellite, or the like. Furthermore, the information associated with the synchronization source may include information indicating that the relay terminal 200 or the remote terminal 300 is in-coverage or out-of-coverage. Furthermore, the information associated with the synchronization source may be an in-coverage indicator used in D2D communication.

Information Associated with Terminal Category

The information indicating a communication status of relay communication may include information indicating a terminal category of the relay terminal 200 or the remote terminal 300.

The information indicating the terminal category is, for example, information indicating an MTC terminal, an NB-IoT terminal, a smartphone, a sensor device, an vehicular onboard unit, or the like.

Terminal Capability

The information indicating a communication status of relay communication may include information indicating a terminal capability of the relay terminal 200 or the remote terminal 300.

The information indicating the terminal capability may include, for example, information indicating at least one of a battery size, a memory size, a CPU processing capacity, a number of radio frequency (RF) chains, a maximum data rate, an available operation mode, or the like.

Information Associated with Remaining Battery Level

The information indicating a communication status of relay communication may include information indicating a remaining battery level of the relay terminal 200 or the remote terminal 300.

The information indicating the battery remaining level may include, for example, information indicating at least one of an absolute value of the battery remaining level, a battery capacity, a relative value of a battery remaining level based on a battery capacity, or a consumption rate of the battery.

Priority Information

The information indicating a communication status of relay communication may include priority information of the relay terminal 200 or the remote terminal 300.

The priority information may include, for example, at least one of information indicating priority of a transmission packet transmitted by the relay terminal 200 or the remote terminal 300, or information indicating priority set for the relay terminal 200 or the remote terminal 300 itself.

Transmission Traffic Type

The information indicating a communication status of relay communication may include information indicating a transmission traffic type of the relay terminal 200 or the remote terminal 300.

The information indicating the transmission traffic type may include at least one of, for example, information indicating a type of traffic that the relay terminal 200 or the remote terminal 300 can transmit, or information indicating a type of traffic of actual transmission. The traffic types may be classified on the basis of data rates such as, for example, high data rates and low data rates.

Operation Request

The information indicating a communication status of relay communication may include an operation request.

The operation request is information for requesting determination of a operation mode. The operation request may include information input from a user.

Location Information

The information indicating a communication status of relay communication may include location information of the relay terminal 200 or the remote terminal 300.

The location information may be information including latitude information, longitude information, and altitude information, or zone information obtained by quantizing those pieces of information. In a case where an operation mode is determined on the basis of the location information, this helps to handle a situation where the user comes home and take off the wearable terminal so that distance between the relay terminal 200 and the remote terminal 300 becomes large.

Information Associated with Resource Pool

The information indicating a communication status of relay communication may include information associated with a resource pool associated with the relay terminal 200 or the remote terminal 300.

The information associated with the resource pool may include at least one of a resource pool allocated to the relay terminal 200 or the remote terminal 300, information indicating a resource pool usable by the relay terminal 200 or the remote terminal 300, or information indicating a congestion degree or an interference degree of those resource pools, for example.

Information Associated with Transmission Opportunity

The information indicating a communication status of relay communication may include information associated with transmission opportunity of the relay terminal 200 or the remote terminal 300.

The information associated with transmission opportunity may include at least one of information indicating a number of transmission opportunities lost due to lack of resource or interference from another terminal devices, for example.

Band Information

The information indicating a communication status of relay communication may include band information of a band in which the relay terminal 200 or the remote terminal 300 is performing communication.

The band information may include at least one of attribute information associated with an unlicensed band, attribute information associated with a licensed band, or attribute information associated with another frequency band, for example. Furthermore, the band information may include information for specifying a frequency.

(2) Notification Timing

Timing to provide notification of the information indicating a communication status of relay communication can be considered in various ways.

The notification may be performed at fixed timing set in advance, or may be performed at a dynamic timing set by the base station 100 or the relay terminal 200. Furthermore, the notification may be performed at timing according to the information indicating an acquired communication status of the relay communication. For example, whether or not to perform notification may be determined on the basis of comparison between the information indicating the acquired communication status of the relay communication with threshold information, and the threshold information may be set by the base station 100 or the relay terminal 200. Furthermore, the notification may be performed at timing according to a current operation mode. More specifically, the notification may be performed at timing according to at least one of the communication distance or traffic type.

(3) Specific Examples

Hereinafter, specific examples regarding the above described determination of the operation mode on the basis of the information indicating the communication status of the relay communication will be described.

First Specific Example

As a first specific example, an example will be described in which the remote terminal 300 measures S-RSRP and notifies the relay terminal 200 of the S-RSRP, and the relay terminal 200 determines the operation mode.

First, the remote terminal 300 determines a parameter related to averaging and filtering S-RSRP. At this time, the remote terminal 300 makes a determination according to a current operation mode. For example, in a case where the current operation mode is a low data rate mode, the remote terminal 300 is set by the base station 100 to perform S-RSRP averaging once in every 1000 ms (milliseconds). Thus, the remote terminal 300 transmits a measurement result of S-RSRP to the relay terminal 200 at a frequency of once in every 1000 ms. Then, the relay terminal 200 determines an operation mode on the basis of the measurement results of S-RSRP received from remote terminal 300.

Second Specific Example

As a second specific example, an example will be described in which the relay terminal 200 measures a remaining battery level and notifies the base station 100 of the measured level, and the base station 100 determines the operation mode.

First, the relay terminal 200 monitors a remaining battery level, and notifies the base station 100 of the measurement result. The notification timing is timing of once in every 100 ms set in the relay terminal 200 in advance. Then, the base station 100 determines an operation mode on the basis of the measurement result of the remaining battery level received from the relay terminal 200.

3.3. Determination of Operation Mode

The master-type device determines an operation mode on the basis of the information obtained by itself or information indicating a communication status of relay communication given in notification from the slave-type device. The operation mode is a mode of operation related to communication between the relay terminal 200 and the remote terminal 300.

A range of a parameter set that can be set for the relay communication may differ depending on the operation mode. In other words, determining an operation mode and determining a settable parameter set are synonymous. From the latter point of view, the master device determines a set of parameters that can be set for communication between the relay terminal 200 and the remote terminal 300 on the basis of the information indicating the communication status of the relay communication. Here, determining a settable parameter set means determining one or more setting target parameters and determining a range (or a candidate) of a setting value of a setting target parameter. In other words, the settable parameter set is information indicating a range (or a candidate) of a setting value that can be set for each of the one or more setting target parameters.

Here, threshold information used to determine the operation mode (in other words, the settable parameter set) may be set in advance, or may be set by the base station 100 or the relay terminal 200.

The operation mode may be defined in various ways. For example, regarding the operation mode, following modes may be defined as a combination of the distance between the relay terminal 200 and the remote terminal 300 and the traffic type of the relay terminal 200 or the remote terminal 300.

First operation mode: short range communication+low data rate
Second operation mode: short range communication+high data rate
Third operation mode: long range communication+low data rate
Fourth operation mode: long range communication+high data rate It is obvious that any mode other than the above may be defined as the operation mode.

In the following, as a specific example, an example will be described in which the relay terminal 200 determines the operation mode on the basis of S-RSRP and a transmission traffic type, which are given in notification from the remote terminal 300.

The relay terminal 200 determines whether or not the S-RSRP given in notification from the remote terminal 300 is smaller than a predetermined threshold. For example, the relay terminal 200 determines the third operation mode in a case where the number of cases that it is determined that the number is smaller than the predetermined threshold reaches a predetermined number and it is notified that the transmission traffic type is a low data rate type.

3.4. Parameter Setting Related to Relay Communication

Each device of the system 1 sets a parameter related to relay communication on the basis of the determination result by the master-type device.

For example, the master-type device sets a parameter related to relay communication on the basis of the result of its own determination. Furthermore, the master-type device notifies the slave-type device of information indicating the determination result, and the slave-type device sets a parameter related to the relay communication on the basis of the information given in notification.

The information indicating the determination result given in notification from the master-type device to the slave-type device may be an index corresponding to the determined settable parameter set, that is, the operation mode. In this case, the slave-type device sets a parameter within the settable parameter set range corresponding to the operation mode given in notification by referring to a table in which the operation mode and the settable parameter set are associated. This table may be set by, for example, the base station 100.

The information indicating the determination result given in notification from the master-type device to the slave-type device may be the determined settable parameter set. For example, the master-type device notifies the slave-type device of a settable parameter set corresponding to the determined operation mode by referring to a table, which is similar to the above described table. Then, the slave-type device sets a parameter within the settable parameter set given in notification. In this case, the master-type device directly controls the parameter of the slave device. The master-type device may determine the settable parameter set according to a level of the information indicating the communication status of relay communication, for example, without determining the operation mode, and in such a case, more sensitive parameter control can be performed.

As described above, the settable parameter set is information indicating a range (or candidate) of setting values that can be set for each of one or more setting target parameters.

Here, the range (or the candidate) of the setting values of the parameter to be set may include a plurality of setting values. In that case, each device of the system 1 sets a setting value selected from the plurality of setting values. For example, the slave-type device sets a parameter out of a limited range regarding a parameter having a restriction corresponding to the operation mode.

Alternatively, the setting value range (or the candidate) of the parameter to be set may include one set value. In that case, each device of the system 1 sets a unique setting value for each operation mode.

Furthermore, the parameter to be set may be one or more. In other words, a single parameter may be set or a plurality of parameters may be set, corresponding to the operation mode.

In the following, an example of a parameter to be set will be described. The settable parameter set may include a setting value range or a candidate for one of at least one or more of parameters described below.

Parameter Related to Link Adaptation

The parameter to be set may be a parameter related to link adaptation.

The parameter related to link adaptation may include information indicating whether or not to perform link adaptation.

The parameter related to link adaptation may include information indicating restriction applied to a range of modulation and coding set (MCS). In other words, restriction may be applied to the range of MCS according to the operation mode. For example, in general, a value of MCS is selected from 1 to 15, but in a case of the third operation mode, restriction is applied to select from 1 to 3.

Parameter Related to Channel Estimation

The parameter to be set may be a parameter related to channel estimation.

The parameter for channel estimation may include information indicating whether or not to perform channel estimation.

The parameter related to channel estimation may include settings for at least one of a period, a duration, or an offset of channel estimation.

Parameter Related to Transmission Power

The parameter to be set may be a parameter related to transmission power.

The parameter related to transmission power may include information indicating whether or not to perform transmission power control.

The parameter related to transmission power may include information indicating restriction applied to a range of transmission power values.

Parameter Related to Resource Pool Allocation

The parameter to be set may be a parameter related to resource pool allocation.

The parameter related to resource pool allocation is information indicating a resource pool to be allocated, and may include, for example, a position (a frequency position and a time position) and a size of the resource pool, and attribute information of the resource pool. As the resource pool attributes, there are a dedicated resource pool that can be used only by a specific terminal device, a shared resource pool that can be shared by multiple terminal devices, a resource pool for specific use, a resource pool that requires sensing, and a resource pool that does not require sensing. Here, the resource pool for specific use may be, for example, a resource pool for each operation mode, such as a resource pool dedicated to high data rates. Furthermore, sensing here is sensing performed to confirm availability of a resource before transmitting a packet.

Parameter Related to Relay Terminal Selection

The parameter to be set may be a parameter related to relay terminal selection.

The parameters related to relay terminal selection may include a criterion of a case where the remote terminal 300 selects the relay terminal 200 to be connected. For example, the remote terminal 300 selects the relay terminal 200 corresponding to a determined operation mode. For example, in a case where the fourth operation mode is determined, the remote terminal 300 connects to a relay terminal 200 that can support the fourth operation mode.

The parameters related to relay terminal selection may include a parameter for identifying the relay terminals 200. For example, the parameter related to relay terminal selection may be information associated with generation of a synchronization signal (for example, a root index) transmitted from the relay terminal 200. In that case, the remote terminal 300 identifies the relay terminal 200 on the basis of the synchronization signal. For example, the parameter related to relay terminal selection may be capability information of the relay terminal 200. In that case, the remote terminal 300 identifies the relay terminal 200 on the basis of the capability information of the relay terminal 200 given in notification from the base station 100 or the relay terminal 200. Note that, for notification of capability information, for example, a broadcast channel (physical sidelink broadcast channel (PSBCH), for example), system information (system information block (SIB), for example), or RRC signaling may be used.

Parameter Related to Resource Pool Sensing

The parameter to be set may be a parameter related to sensing of a resource pool. The sensing here is sensing performed to confirm the availability of a resource before transmitting a packet.

The parameter related to sensing of the resource pool may include information indicating whether or not to perform sensing.

The parameter related to sensing of a resource pool may include information indicating restriction applied to the sensing. In other words, restriction may be applied to the sensing depending on the operation mode. For example, restriction may be applied regarding a sensing region (a frequency band or a period, for example), threshold information for candidate resource determination, a number of selectable candidate resources, or a number of resource reservations.

Parameter Related to Congestion Level Control

The parameter to be set may be a parameter related to congestion level control. The congestion level here is a level of congestion of sidelink communication. For example, the level of congestion may be defined as a degree of use of a resource.

The parameter related to the congestion level may include information indicating whether or not to perform control based on the congestion level.

The parameters related to the congestion level may include a parameter that changes according to the congestion level, and information indicating a change width.

Parameter Related to Retransmission Control

The parameter to be set may be a parameter related to retransmission control.

The parameter related to retransmission control may include information indicating whether or not to execute retransmission control.

The parameter related to retransmission control may include information indicating restriction applied to the retransmission control. In other words, restriction may be applied to retransmission control according to the operation mode. For example, restriction is applied to a maximum number of retransmission depending on the operation mode.

Parameter Related to Repetition Transmission

The parameter to be set may be a parameter related to repetition transmission. Note that the repetition transmission here refers to transmitting a same packet without ACK or NACK information.

The parameter related to repetition transmission may include information indicating whether or not to perform repetition transmission.

The parameter related to repetition transmission may include information indicating restriction applied to the repetition transmission. In other words, restrictions may be applied to repetition transmission according to the operation mode. For example, restriction is applied to a maximum number of repetitions according to the operation mode.

Priority of Synchronization Source

The parameter to be set may be synchronization source priority.

Priority of the synchronization source can be changed according to the operation mode. For example, as the synchronization source of the remote terminal 300, the base station 100 is usually prioritized over the relay terminal 200, and after the change of the operation mode, the relay terminal 200 is prioritized over the base station 100.

Transmission Frequency Band

The parameter to be set may be a transmission frequency band.

The transmission frequency band can be changed according to the operation mode. For example, according to the operation mode, it can be switched whether to use a license band or to use an unlicensed band.

In the above, an example of the parameter to be set has been described.

In the following, as a specific example, an example will be described in which the remote terminal 300 sets a parameter related to link adaptation and a parameter related to channel estimation in a case where the fourth operation mode is determined.

It is assumed that the table shown in Table 1 below is set in advance by the base station 100 in the remote terminal 300. Table 1 is an example of a table in which the operation mode is associated with setting values of a parameter related to link adaptation and a parameter related to channel estimation. In a case of being notified that the fourth operation mode has been determined, the remote terminal 300 refers to the table, selects an MCS from 5 to 10, and sets a parameter (10 ms, 5 ms, 0 ms) related to channel state estimation.

TABLE 1

| | CORRESPONDENCE TABLE OF OPERATION MODES AND TRANSMISSION PARAMETERS | |
|---|---|---|
| OPERATION MODE | MCS RANGE | PARAMETER RELATED TO CHANNEL STATE ESTIMATION (Period, Duration, offset) |
| 1 | DO NOT PERFORM LINK ADAPTATION | DO NOT PERFORM CHANNEL STATE ESTIMATION |
| 2 | MCS 8-15 | PERFORM (100 ms, 10 ms, 5 ms) |
| 3 | MCS 1-7 | PERFORM (10 ms, 10 ms, 10 ms) |
| 4 | MCS 5-10 | PERFORM (10 ms, 5 ms, 0 ms) |

4. Application Examples

The technology according to the present disclosure can be applied to various products. For example, the base station 100 may be realized as any type of evolved node B (eNB) such as a macro eNB or a small eNB. The small eNB may be an eNB that covers a cell smaller than a macro cell, such as a pico eNB, a micro eNB, or a home (femto) eNB. As a substitute for the above, the base station 100 may be realized as another type of base station such as a Node B or a base transceiver station (BTS). The base station 100 may include a main body (also referred to as a base station device) that controls wireless communication, and one or more remote radio heads (RRHs) disposed at a location different from the main body. Furthermore, later described various types of terminals may operate as the base station 100 by temporarily or semipermanently executing the base station function.

Furthermore, for example, the terminal device 200 or 300 may be realized as a mobile terminal such as a smartphone, a tablet personal computer (PC), a notebook PC, a portable game terminal, a portable/dongle type mobile router or a digital camera, or an on-board terminal such as a car navigation device. Furthermore, the terminal device 200 or 300 may be realized as a terminal (also referred to as a machine type communication (MTC) terminal) that performs machine-to-machine (M2M) communication. Furthermore, the terminal device 200 or 300 may be a wireless communication module (for example, an integrated circuit module configured with one die) mounted on the terminals.

4.1. Application Example of Base Station

First Application Example

Figure 17:
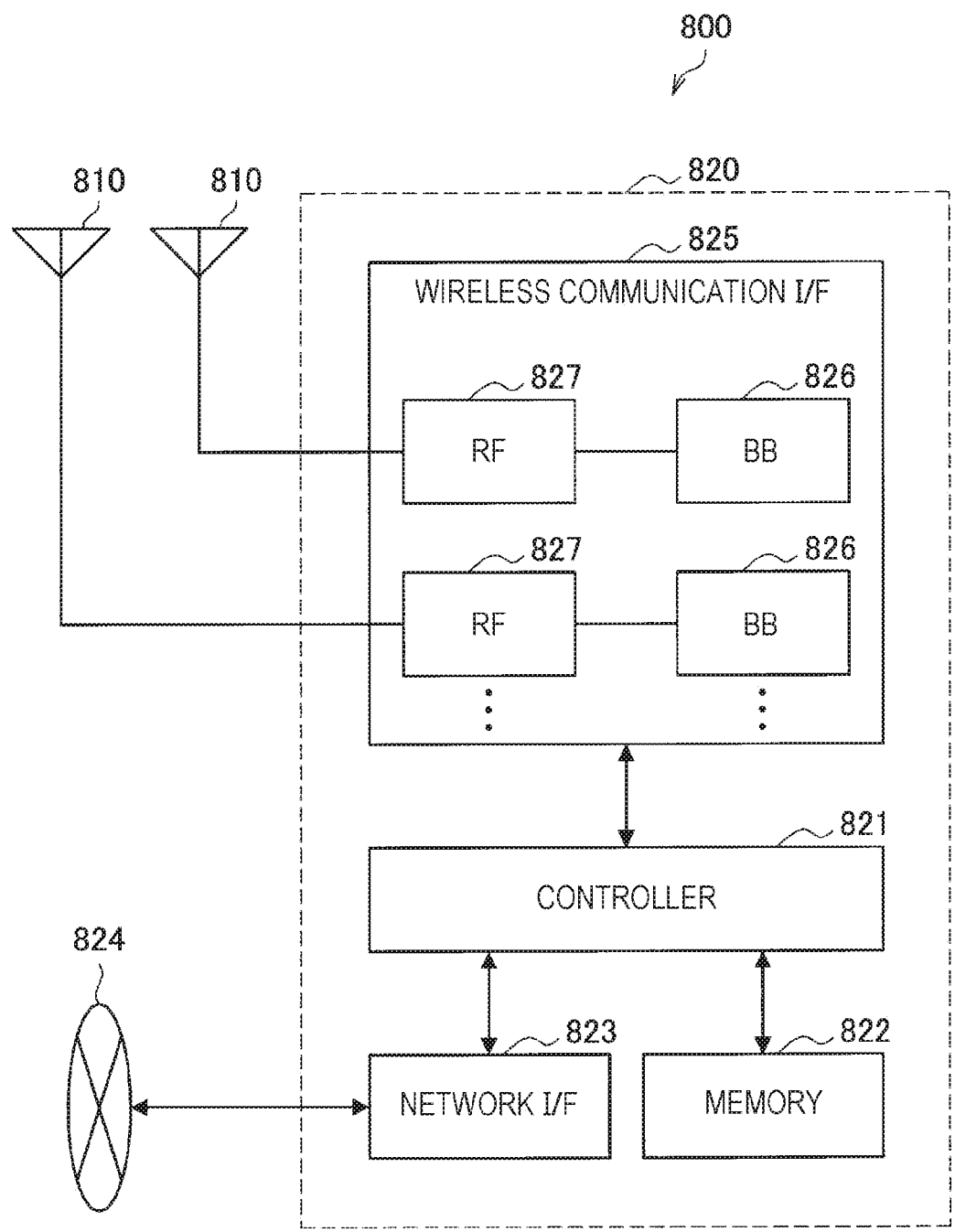
FIG. 17 is a block diagram illustrating a first example of a schematic configuration of an eNB.

FIG. 17 is a block diagram illustrating a first example of a schematic configuration of an eNB to which the technology of the present disclosure can be applied. The eNB 800 has one or more antennas 810 and a base station device 820. Each antenna 810 and the base station device 820 may be connected to each other via an RF cable.

Each of the antennas 810 has a single or a plurality of antenna elements (for example, a plurality of antenna elements constituting a MIMO antenna), and is used for transmission and reception of a wireless signal by the base station device 820. The eNB 800 may have a plurality of antennas 810 as illustrated in FIG. 17, and the plurality of antennas 810 may correspond to, for example, a plurality of frequency bands used by the eNB 800, respectively. Here, although FIG. 17 illustrates an example in which the eNB 800 has a plurality of antennas 810, the eNB 800 may have a single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet through the network interface 823. The controller 821 may generate a bundled packet by bundling data from a plurality of baseband processors and transfer the generated bundled packet. Furthermore, the controller 821 may include a logical function for executing controls such as radio resource control, radio bearer control, mobility management, admission control, scheduling, or the like. Furthermore, the control may be executed in cooperation with neighboring eNBs or core network nodes. The memory 822 includes a RAM and a ROM, and stores a program to be executed by the controller 821 and various control data (for example, a terminal list, transmission power data, scheduling data, and the like).

The network interface 823 is a communication interface for connecting the base station device 820 to a core network 824. The controller 821 may communicate with a core network node or another eNB via the network interface 823. In this case, the eNB 800 and the core network node or another eNB may be connected to each other by a logical interface (for example, an S1 interface or an X2 interface). The network interface 823 may be a wired communication interface or a wireless communication interface for a wireless backhaul. In a case where the network interface 823 is a wireless communication interface, the network interface 823 may use a higher frequency band for wireless communication than a frequency band used by the wireless communication interface 825.

The wireless communication interface 825 supports any one of cellular communication system such as long term evolution (LTE) or LTE-Advanced, and provides a wireless connection to a terminal located in a cell of the eNB 800 via the antenna 810. The wireless communication interface 825 may typically include a baseband (BB) processor 826, an RF circuit 827, and the like. The BB processor 826 may perform, for example, coding/decoding, modulation/demodulation, multiplexing/demultiplexing, and the like, and execute various signal processes in each layer (for example, L1, medium access control (MAC), radio link control (RLC), and packet data convergence protocol (PDCP). The BB processor 826 may have some or all of the logical functions described above, as a substitute for the controller 821. The BB processor 826 may serve as a memory that stores a communication control program, a processor that executes the program, and a module including related circuits, and the functions of the BB processor 826 can be changed by updating the program. Furthermore, the module may be a card or a blade to be inserted into a slot of the base station device 820, or may be a chip to be mounted on the card or blade. On the other hand, the RF circuit 827 may include a mixer, a filter, an amplifier, and the like, and transmits and receives a wireless signal through the antenna 810.

The wireless communication interface 825 may include a plurality of BB processors 826 as illustrated in FIG. 17, and the plurality of BB processors 826 may correspond to, for example, a plurality of frequency bands used by the eNB 800, respectively. In addition, the wireless communication interface 825 may include a plurality of RF circuits 827 as illustrated in FIG. 17, and the plurality of RF circuits 827 may correspond to, for example, a plurality of antenna elements, respectively. Here, although FIG. 17 illustrates an example in which the wireless communication interface 825 includes a plurality of BB processors 826 and a plurality of RF circuits 827, the wireless communication interface 825 may include a single BB processor 826 or a single RF circuit 827.

In the eNB 800 illustrated in FIG. 17, one or more components (the operation mode determination processing unit 151 and/or the communication processing unit 153) included in the processing unit 150 described with reference to FIG. 3 may be mounted in the wireless communication interface 825. Alternatively, at least a part of these components may be implemented in the controller 821. As one example, the eNB 800 may be equipped with a module including a part (for example, the BB processor 826) or all of the wireless communication interface 825 and/or the controller 821, and one or more components may be implemented in the module. In this case, the module may store a program for causing a processor to function as the one or more components (in other words, a program for causing the processor to execute the operation of the one or more components) to execute the program. As another example, a program for causing a processor to function as the one or more components may be installed in the eNB 800, and the wireless communication interface 825 (for example, the BB processor 826) and/or the controller 821 may execute the program. As described above, the eNB 800, the base station device 820, or the module may be provided as an apparatus including the one or more components, and a program for causing a processor to function as the one or more components may be provided. Furthermore, a readable recording medium which includes the program recorded thereon may be provided.

Furthermore, in the eNB 800 illustrated in FIG. 17, the wireless communication unit 120 described with reference to FIG. 3 may be implemented in the wireless communication interface 825 (for example, the RF circuit 827). Furthermore, the antenna unit 110 may be mounted on the antenna 810. Furthermore, the network communication unit 130 may be implemented in the controller 821 and/or the network interface 823. Also, the storage unit 140 may be implemented in the memory 822.

Second Application Example

Figure 18:
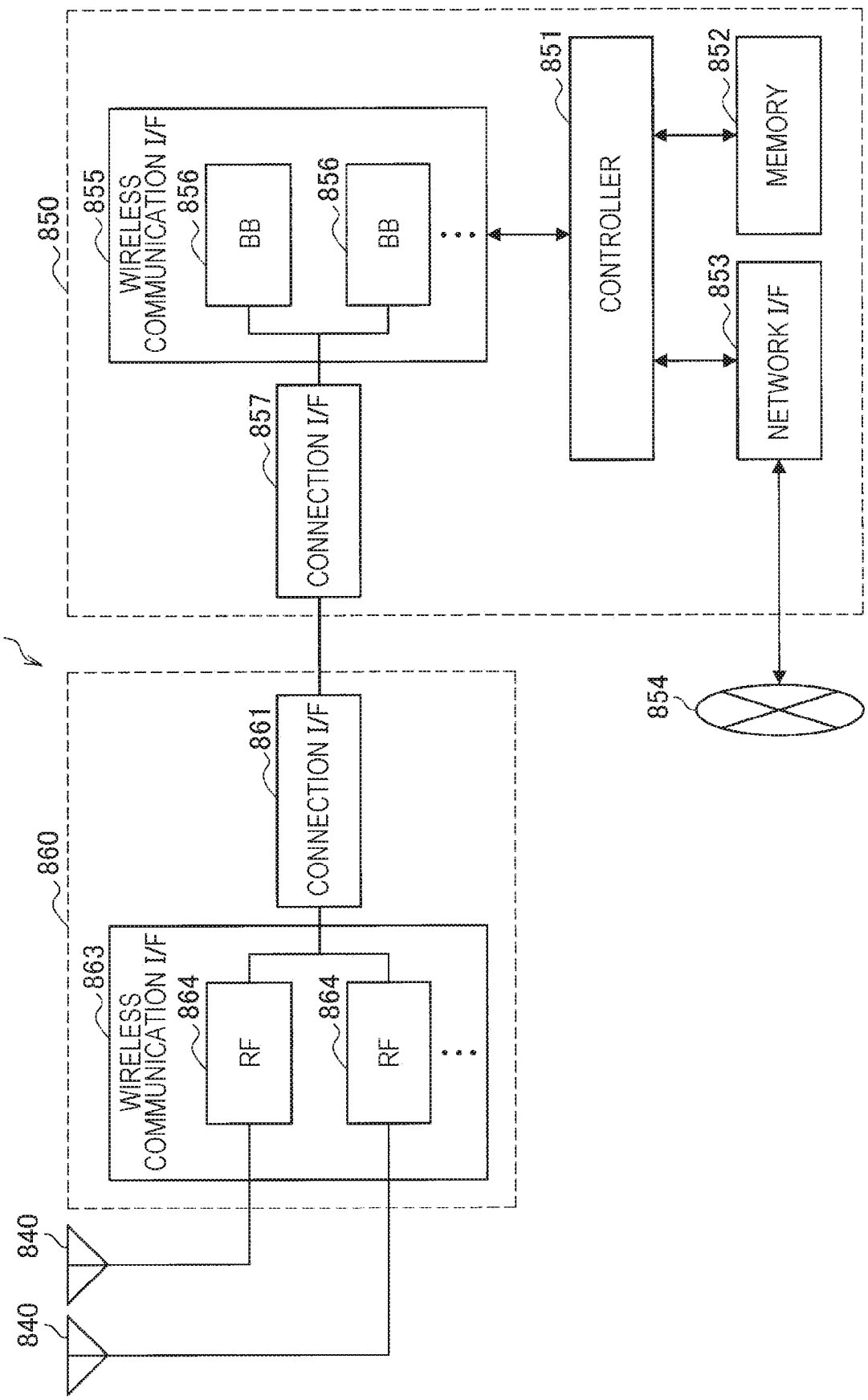
FIG. 18 is a block diagram illustrating a second example of the schematic configuration of the eNB.

FIG. 18 is a block diagram illustrating a second example of a schematic configuration of an eNB to which the technology of the present disclosure may be applied. The eNB 830 includes one or more antennas 840, a base station device 850, and an RRH 860. Each antenna 840 and RRH 860 may be connected to each other via an RF cable. Furthermore, the base station device 850 and the RRH 860 may be connected to each other by a high speed line such as an optical fiber cable.

Each of the antennas 840 has a single or a plurality of antenna elements (for example, a plurality of antenna elements constituting a MIMO antenna), and is used for transmission and reception of a radio signal by the RRH 860. The eNB 830 may have a plurality of antennas 840 as illustrated in FIG. 18, and the plurality of antennas 840 may correspond to, for example, a plurality of frequency bands used by the eNB 830, respectively. Here, although FIG. 18 illustrates an example in which the eNB 830 has a plurality of antennas 840, the eNB 830 may have a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 17.

The wireless communication interface 855 supports any one of cellular communication system such as LTE, LTE-Advanced, and the like, and provides a wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 17, except that the BB processor 856 is connected to the RF circuit 864 of the RRH 860 via the connection interface 857. The wireless communication interface 855 includes a plurality of BB processors 856 as illustrated in FIG. 18, and the plurality of BB processors 856 may correspond to, for example, a plurality of frequency bands used by the eNB 830, respectively. Here, although FIG. 18 illustrates an example in which the wireless communication interface 855 includes a plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high-speed line that connects the base station device 850 (wireless communication interface 855) and the RRH 860.

Furthermore, the RRH 860 also includes a connection interface 861 and a wireless communication interface 863.

The connection interface 861 is an interface for connecting the RRH 860 (wireless communication interface 863) to the base station device 850. The connection interface 861 may be a communication module for communication using the high speed line.

The wireless communication interface 863 transmits and receives a wireless signal via the antenna 840. The wireless communication interface 863 may typically include an RF circuit 864 and the like. The RF circuit 864 may include a mixer, a filter, an amplifier, and the like, and transmits and receives wireless signals via the antenna 840. The wireless communication interface 863 may include a plurality of RF circuits 864 as illustrated in FIG. 18, and the plurality of RF circuits 864 may correspond to, for example, a plurality of antenna elements, respectively. Here, although FIG. 18 illustrates an example in which the wireless communication interface 863 includes the plurality of RF circuits 864, the wireless communication interface 863 may include a single RF circuit 864.

In the eNB 830 illustrated in FIG. 18, one or more components (the operation mode determination processing unit 151 and/or the communication processing unit 153) included in the processing unit 150 described with reference to FIG. 3 may be implemented in the wireless communication interface 855 and/or the wireless communication interface 863. Alternatively, at least a part of these components may be implemented in the controller 851. As one example, the eNB 830 includes a module including a part (for example, the BB processor 856) or all of the wireless communication interface 855, and/or the controller 851, and one or more components may be mounted in the module. In this case, the module may store a program for causing a processor to function as the one or more components (in other words, a program for causing the processor to execute the operation of the one or more components) to execute the program. As another example, a program for causing a processor to function as the one or more components may be installed in the eNB 830, and the wireless communication interface 855 (for example, the BB processor 856) and/or the controller 851 may execute the program. As described above, the eNB 830, the base station device 850, or the module may be provided as an apparatus including the one or more components, and a program for causing a processor to function as the one or more components may be provided. Furthermore, a readable recording medium which includes the program recorded thereon may be provided.

Furthermore, in the eNB 830 illustrated in FIG. 18, for example, the wireless communication unit 120 described with reference to FIG. 3 may be implemented in the wireless communication interface 863 (for example, the RF circuit 864). Furthermore, the antenna unit 110 may be mounted on the antenna 840. Furthermore, the network communication unit 130 may be implemented in the controller 851 and/or the network interface 853. Furthermore, the storage unit 140 may be implemented in the memory 852.

4.2. Application Example of Terminal Device

First Application Example

Figure 19:
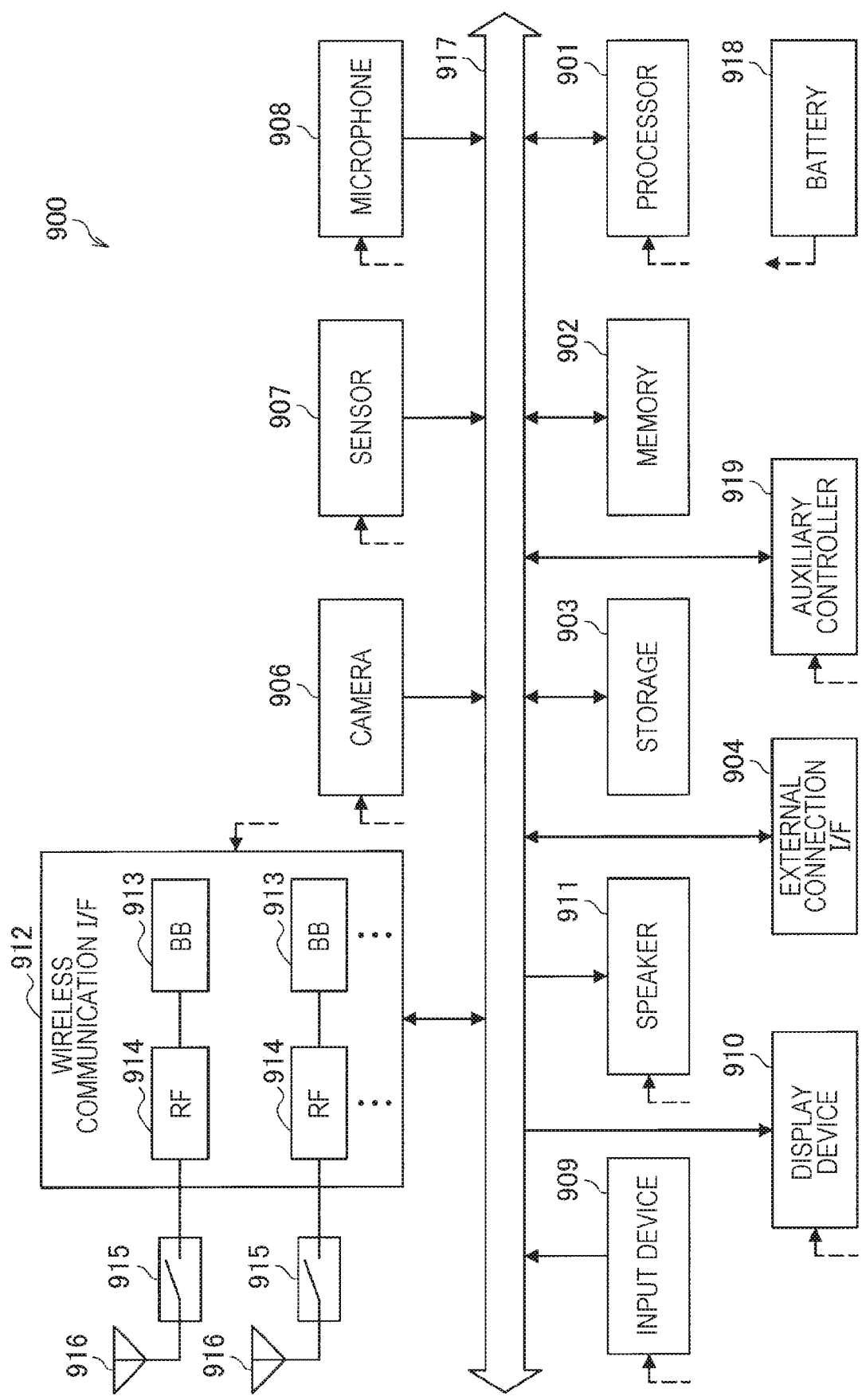
FIG. 19 is a block diagram illustrating an example of a schematic configuration of a smartphone.

FIG. 19 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores a program and data to be executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 includes an imaging element such as, for example, a charge coupled device (CCD) or a complementary metal oxide semiconductor (CMOS), and generates a captured image. The sensor 907 may include, for example, a sensor group such as a positioning sensor, a gyro sensor, a geomagnetic sensor, and an acceleration sensor. The microphone 908 converts a voice input to the smartphone 900 into a voice signal. The input device 909 includes a touch sensor, a keypad, a keyboard, a button, a switch, or the like for detecting a touch on the screen of the display device 910, for example, and accepts an operation or information input from a user. The display device 910 has a screen such as a liquid crystal display (LCD) or an organic light emitting diode (OLED) display, and displays an output image of the smartphone 900. The speaker 911 converts the audio signal output from the smartphone 900 into sound.

The wireless communication interface 912 supports any cellular communication system such as LTE or LTE-Advanced to perform wireless communication. The wireless communication interface 912 may typically include a BB processor 913, an RF circuit 914, and the like. The BB processor 913 may perform, for example, encoding/decoding, modulation/demodulation, multiplexing/demultiplexing, and the like, and perform various signal processing for wireless communication. On the other hand, the RF circuit 914 may include a mixer, a filter, an amplifier, and the like, and transmits and receives a wireless signal through the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 19. Here, although FIG. 19 illustrates an example in which the wireless communication interface 912 includes the plurality of BB processors 913 and the plurality of RF circuits 914, the wireless communication interface 912 may include a single BB processor 913 or a single RF circuit 914.

Furthermore, in addition to the cellular communication system, the wireless communication interface 912 may support other types of wireless communication systems, such as a short range communication system, a close proximity wireless communication system, or a wireless local area network (LAN) system and, in that case, the BB processor 913 and the RF circuit 914 for each wireless communication system may be included.

Each of antenna switches 915 switches the connection destination of the antenna 916 among a plurality of circuits (for example, circuits for different wireless communication systems) included in the wireless communication interface 912.

Each of the antennas 916 has a single or a plurality of antenna elements (for example, a plurality of antenna elements constituting a MIMO antenna), and is used for transmission and reception of a wireless signal by the wireless communication interface 912. The smartphone 900 may have a plurality of antennas 916 as illustrated in FIG. 19. Here, although FIG. 19 illustrates an example in which the smartphone 900 has the plurality of antennas 916, the smartphone 900 may have a single antenna 916.

Furthermore, the smartphone 900 may include the antenna 916 for each wireless communication system. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to one another. The battery 918 supplies power to each block of the smartphone 900 illustrated in FIG. 19 through a feed line partially represented by the broken lines in the figure. For example, the auxiliary controller 919 operates the minimum necessary functions of the smartphone 900 in the sleep mode.

In the smartphone 900 illustrated in FIG. 19, one or more components (the operation mode determination processing unit 241 and/or the communication processing unit 243) included in the processing unit 240 described with reference to FIG. 4 or one or more components (operation mode determination processing unit 341 and/or communication processing unit 343) included in the processing unit 340 described above with reference to FIG. 5 may be implemented in the wireless communication interface 912. Alternatively, at least a part of these components may be implemented in the processor 901 or the auxiliary controller 919. As one example, the smartphone 900 includes a module including a part (for example, the BB processor 913) or all of the wireless communication interface 912, the processor 901, and/or the auxiliary controller 919, and the one or more components may be mounted in the module. In this case, the module may store a program for causing a processor to function as the one or more components (in other words, a program for causing the processor to execute the operation of the one or more components) to execute the program. As another example, a program for causing a processor to function as the one or more components is installed in the smartphone 900, and the wireless communication interface 912 (for example, the BB processor 913), the processor 901, and/or the auxiliary controller 919 may execute the program. As described above, the smartphone 900 or the module may be provided as a device including the one or more components, and a program for causing a processor to function as the one or more components may be provided. Furthermore, a readable recording medium which includes the program recorded thereon may be provided.

Furthermore, in the smartphone 900 illustrated in FIG. 19, for example, the wireless communication unit 220 described with reference to FIG. 4 or the wireless communication unit 320 described with reference to FIG. 5 may be implemented in the wireless communication interface 912 (for example, the RF circuit 914). Furthermore the antenna unit 210 or the antenna unit 310 may be mounted on the antenna 916. In addition, the storage unit 230 or the storage unit 330 may be implemented in the memory 902.

Second Application Example

Figure 20:
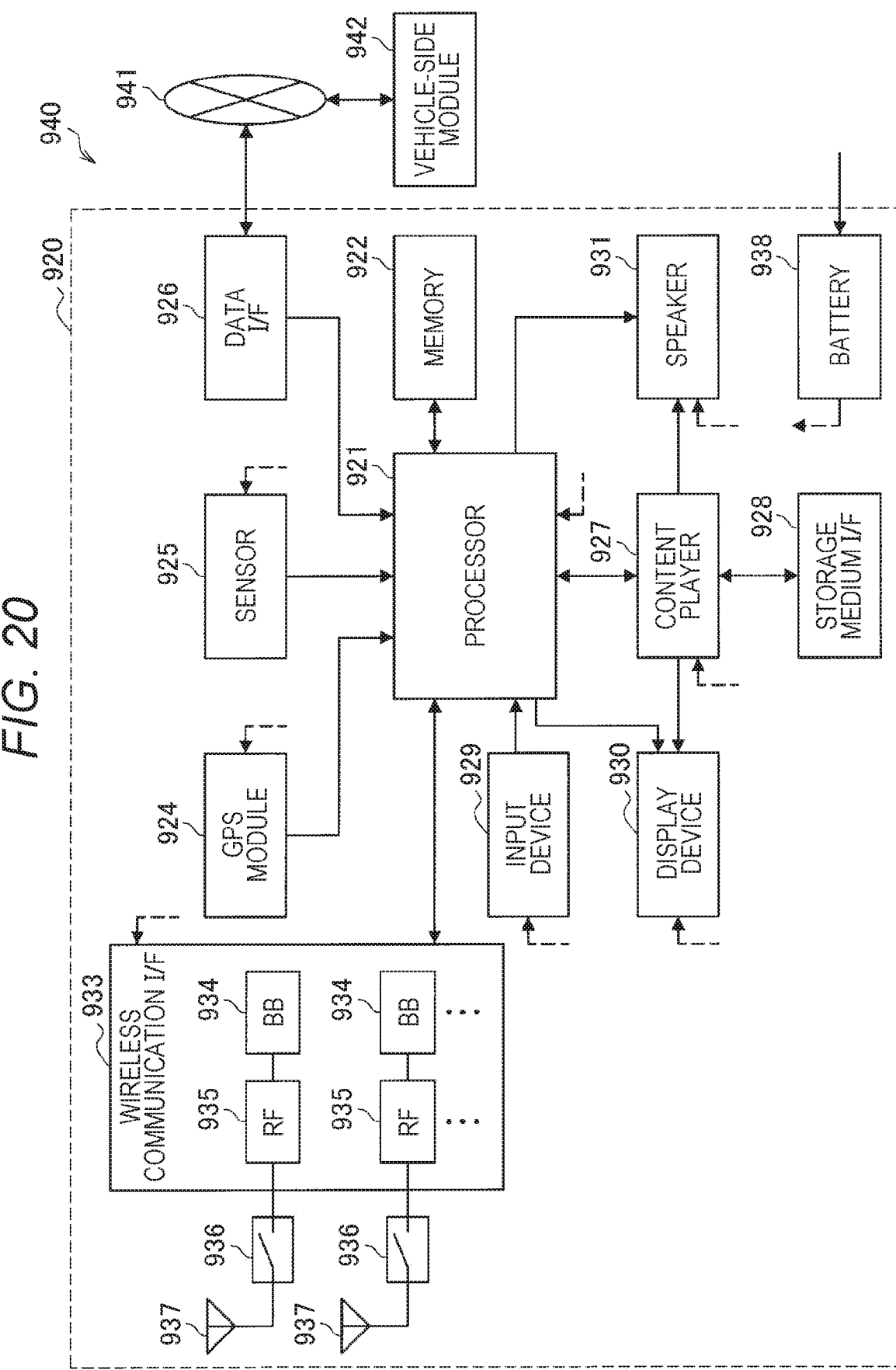
FIG. 20 is a block diagram illustrating an example of a schematic configuration of a car navigation device.

FIG. 20 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and other functions of the car navigation device 920. The memory 922 includes a RAM and a ROM, and stores a program and data to be executed by the processor 921.

The GPS module 924 uses a GPS signal received from a GPS satellite to measure a location (latitude, longitude, and altitude, for example) of the car navigation device 920. The sensor 925 may include, for example, a sensor group such as a gyro sensor, a geomagnetic sensor, and an air pressure sensor. The data interface 926 is connected to an in-vehicle network 941 via an unillustrated terminal, for example, and acquires data, such as vehicle speed data, generated on the vehicle side.

The content player 927 reproduces content stored in a storage medium (for example, CD or DVD) inserted in the storage medium interface 928. The input device 929 includes, for example, a touch sensor, a button, a switch, or the like for detecting a touch on the screen of the display device 930, and accepts an operation or information input by the user. The display device 930 has a screen such as an LCD or an OLED display, and displays a navigation function or an image of the content to be reproduced. The speaker 931 outputs the navigation function or the sound of the content to be reproduced.

The wireless communication interface 933 supports any one of cellular communication systems such as LTE or LTE-Advanced, and performs wireless communication. The wireless communication interface 933 may typically include a BB processor 934, an RF circuit 935, and the like. The BB processor 934 may perform, for example, encoding/decoding, modulation/demodulation, multiplexing/demultiplexing, and the like, and perform various signal processing for wireless communications. On the other hand, the RF circuit 935 may include a mixer, a filter, an amplifier, and the like, and transmits and receives a wireless signal through the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 20. Here, although FIG. 20 illustrates an example in which the wireless communication interface 933 includes the plurality of BB processors 934 and the plurality of RF circuits 935, the wireless communication interface 933 may include a single BB processor 934 or a single RF circuit 935.

Furthermore, in addition to the cellular communication system, the wireless communication interface 933 may support another type of a wireless communication system such as a short distance wireless communication system, a close proximity wireless communication system, or a wireless LAN system and, in such a case, the BB processor 934 and the RF circuit 935 for each communication system may be included.

Each of the antenna switches 936 switches the connection destination of the antenna 937 among a plurality of circuits (for example, circuits for different wireless communication systems) included in the wireless communication interface 933.

Each of the antennas 937 has a single or a plurality of antenna elements (for example, a plurality of antenna elements constituting a MIMO antenna), and is used for transmission and reception of a wireless signal by the wireless communication interface 933. The car navigation device 920 may have a plurality of antennas 937 as illustrated in FIG. 20. Here, although FIG. 20 illustrates an example in which the car navigation device 920 has a plurality of antennas 937, the car navigation device 920 may have a single antenna 937.

Furthermore, the car navigation device 920 may include the antenna 937 for each wireless communication system. In that case, the antenna switch 936 may be omitted from the configuration of the car navigation device 920.

The battery 938 supplies power to each block of the car navigation device 920 illustrated in FIG. 20 through a feed line partially represented by the broken lines in the figure. Furthermore, the battery 938 accumulates power supplied from the vehicle side.

In the car navigation device 920 illustrated in FIG. 20, one or more components (the operation mode determination processing unit 241 and/or the communication processing unit 243) included in the processing unit 240 described with reference to FIG. 4 or one or more components (the operation mode determination processing unit 341 and/or the communication processing unit 343) included in the processing unit 340 described with reference to FIG. 5 may be implemented in the wireless communication interface 933. Alternatively, at least a part of these components may be implemented in the processor 921. As an example, the car navigation device 920 includes a module including a part (for example, the BB processor 934) or all of the wireless communication interface 933, and/or the processor 921, and one or more components may be mounted in the module. In this case, the module may store a program for causing a processor to function as the one or more components (in other words, a program for causing the processor to execute the operation of the one or more components) to execute the program. As another example, a program for causing the processor to function as the one or more components may be installed in the car navigation device 920, and the wireless communication interface 933 (for example, the BB processor 934) and/or the processor 921 may execute the program. As described above, the car navigation device 920 or the module may be provided as a device including the one or more components, and a program for causing the processor to function as the one or more components may be provided. Furthermore, a readable recording medium which includes the program recorded thereon may be provided.

Furthermore, in the car navigation device 920 illustrated in FIG. 20, for example, the wireless communication unit 220 described with reference to FIG. 4 or the wireless communication unit 320 described with reference to FIG. 5 may be implemented in the wireless communication interface 933 (the RF circuit 935, for example). In addition, the antenna unit 210 or the antenna unit 310 may be mounted on the antenna 937. Furthermore, the storage unit 230 or the storage unit 330 may be mounted in the memory 922.

In addition, the technology according to the present disclosure may be realized as an in-vehicle system (or vehicle) 940 including one or more blocks of the car navigation device 920, the in-vehicle network 941, and the vehicle-side module 942. The vehicle-side module 942 generates vehicle side data such as vehicle speed, engine speed, or failure information, and outputs the generated data to the in-vehicle network 941.

5. Conclusion

In the above, the embodiment of the present disclosure has been described in detail with reference to FIGS. 1 to 20. As described above, the relay terminal 200 determines a set of parameters that can be set for relay communication on the basis of information indicating a communication status related to distance or traffic between the relay terminal 200 and the remote terminal 300, and notifies the remote terminal 300 of the determination result. As a result, the relay terminal 200 and the remote terminal 300 can perform relay communication by setting appropriate parameters according to the communication status. For example, the relay terminal 200 and the remote terminal 300 can perform relay communication with parameters according to the classification of communication status such as long range communication or short range communication, high data rate or low data rate, and the like.

In the above, although the preferred embodiment of the present disclosure has been described in detail with reference to the accompanying drawings, the technical scope of the present disclosure is not limited to such examples. It is obvious that persons having ordinary knowledge in the technical field of the present disclosure can conceive various changes or modifications within the scope of the technical idea described in the claims and it is naturally understood that those changes and modifications belong to the technical scope of the present disclosure.

Furthermore, in the present specification, the processes described with reference to the flowcharts and sequence diagrams do not necessarily have to be executed in the illustrated order. Some processing steps may be performed in parallel. Furthermore, additional processing steps may be employed and some processing steps may be omitted.

In addition, the effects described in the present specification are merely illustrative or exemplary and do not set any limitation. In other words, the technique according to the present disclosure can provide other effects obvious to those skilled in the art from the description of the present specification together with the above described effects or in addition to the above effects.

Note that the following configurations are also within the technical scope of the present disclosure.

(1)
A relay communication device that is made movable and relays communication between a base station and a remote terminal, the relay communication device including:
a determination unit configured to determine a parameter set on the basis of information indicating a communication status related to distance or traffic between the relay communication device and the remote terminal, the parameter set being settable regarding communication between the relay communication device and the remote terminal; and
a notification unit configured to notify the remote terminal of information indicating a determination result by the determination unit.

(2)
The relay communication device according to (1), in which the information indicating the communication status related to the distance includes information associated with received power of a sidelink established between the relay communication device and the remote terminal.

(3)
The relay communication device according to (1) or (2), in which the information indicating the communication status includes information indicating a transmission traffic type of the relay communication device or the remote terminal.

(4)
The relay communication device according to any one of (1) to (3), in which the information indicating the communication status includes location information of the relay communication device or the remote terminal.

(5)
The relay communication device according to any one of (1) to (4), in which the information indicating the communication status includes information associated with a synchronization source of the relay communication device or the remote terminal.

(6)
The relay communication device according to any one of (1) to (5), in which the information indicating the communication status includes information indicating a terminal category of the relay communication device or the remote terminal.

(7)
The relay communication device according to any one of (1) to (6), in which the information indicating the communication status includes information indicating a remaining battery level of the relay communication device or the remote terminal.

(8)
The relay communication device according to any one of (1) to (7), in which the information indicating the communication status includes information associated with a resource pool associated with the relay communication device or the remote terminal.

(9)
The relay communication device according to any one of (1) to (8), in which the information indicating the communication status is given in notification from another device at timing corresponding to the obtained information indicating the communication status or at timing corresponding to a current parameter set.

(10)
The relay communication device according to any one of (1) to (9), in which the parameter set includes a parameter related to link adaptation.

(11)
The relay communication device according to any one of (1) to (10), in which the parameter set includes a parameter related to channel estimation.

(12)
The relay communication device according to any one of (1) to (11), in which the parameter set includes priority of a synchronization source.

(13)
The relay communication device according to any one of (1) to (12), in which the parameter set includes at least one of a parameter related to transmission power, a parameter related to resource pool allocation, a parameter related to retransmission control, or a parameter related to repetition transmission.

(14)
The relay communication device according to an one of (1) to (13), in which the information indicating the determination result is an index corresponding to a determined settable parameter set.

(15)
The relay communication device according to any one of (1) to (13), in which the information indicating the determination result is a determined settable parameter set.

(16)
A base station that is communicable with a remote terminal via relay of communication by a movable relay communication device, the base station including:
a determination unit configured to determine a parameter set on the basis of information indicating a communication status related to distance or traffic between the relay communication device and the remote terminal, the parameter set being settable regarding communication between the relay communication device and the remote terminal; and a notification unit configured to notify the relay communication device and the remote terminal of information indicating a determination result by the determination unit.

(17)

A method executed by a relay communication device that is made movable and relays communication between a base station and a remote terminal, the method including:

determining a parameter set on the basis of information indicating a communication status related to distance or traffic between the relay communication device and the remote terminal, the parameter set being settable regarding communication between the relay communication device and the remote terminal; and notifying the remote terminal of information indicating a determination result.

(18)

A method executed by a base station that is communicable with a remote terminal via a relay of communication by a movable relay communication device, the method including:

determining a parameter set on the basis of information indicating a communication status related to distance or traffic between the relay communication device and the remote terminal, the parameter set being settable regarding communication between the relay communication device and the remote terminal; and notifying the relay communication device and the remote terminal of information indicating a determination result.

(19)

A recording medium storing a program that causes a computer in a relay communication device, the relay communication device being made movable and relaying communication between a base station and a remote terminal, to function as:

a determination unit configured to determine a parameter set on the basis of information indicating a communication status related to distance or traffic between the relay communication device and the remote terminal, the parameter set being settable regarding communication between the relay communication device and the remote terminal; and a notification unit configured to notify the remote terminal of information indicating a determination result by the determination unit.

(20)

A recording medium storing a program that causes a computer in a base station, the base station being communicable with a remote terminal via a relay of communication by a movable relay communication device, to function as:

a determination unit configured to determine a parameter set on the basis of information indicating a communication status related to distance or traffic between the relay communication device and the remote terminal, the parameter set being settable regarding communication between the relay communication device and the remote terminal; and a notification unit configured to notify the relay communication device and the remote terminal of information indicating a determination result by the determination unit.

REFERENCE SIGNS LIST

1 System
100 Base station
110 Antenna unit
120 Wireless communication unit
130 Network communication unit
140 Storage unit
150 Processing unit
151 Operation mode determination unit
153 Communication processing unit
200 Terminal device, Relay terminal
210 Antenna unit
220 Wireless communication unit
230 Storage unit
240 Processing unit
241 Operation mode determination unit
243 Communication processing unit
300 Terminal device, Remote terminal
310 Antenna unit
320 Wireless communication unit
330 Storage unit
340 Processing unit
341 Operation mode determination unit
343 Communication processing unit
400 Master-type operation mode determination unit
401 Acquisition unit
403 Determination unit
405 Notification unit
410 Slave-type operation mode determination unit
411 Notification unit
413 Acquisition unit

The invention claimed is:

1. A relay communication device, comprising:

a central processing unit (CPU) configured to:

determine a parameter set based on first information that indicates a communication status related to a distance or traffic between the relay communication device and a remote terminal, wherein the parameter set is settable regarding communication between the relay communication device and the remote terminal, the first information includes a category of terminal corresponding to at least one of the relay communication device or the remote terminal, the first information further includes information associated with received power of a sidelink established between the relay communication device and the remote terminal, the received power of the sidelink includes parameters related to one of an averaging process or a filtering process, the parameters are associated with a measurement of at least one of sidelink reference signal received power (S-RSRP) or sidelink reference signal received quality (S-RSRQ), a timing of the measurement of at least one of the S-RSRP or the S-RSRQ corresponds to one of a fixed timing, a dynamic timing, or a specific timing based on the first information, the timing of the measurement is based on the first information that indicates the communication status of the relay communication device such that an availability of the relay communication device is determined based on a comparison between the first information and threshold information, the threshold information is set by the relay communication device, and the timing of the measurement is further based on an operation mode; and notify the remote terminal of second information, wherein the second information indicates a result of the determination of the parameter set.

2. The relay communication device according to claim 1, wherein the first information further includes a transmission traffic type of at least one of the relay communication device or the remote terminal.

3. The relay communication device according to claim 1, wherein the first information further includes location information of at least one of the relay communication device or the remote terminal.

4. The relay communication device according to claim 1, wherein the first information further includes information associated with a synchronization source of at least one of the relay communication device or the remote terminal.

5. The relay communication device according to claim 1, wherein the first information further includes a remaining battery level of at least one of the relay communication device or the remote terminal.

6. The relay communication device according to claim 1, wherein the first information further includes information associated with a resource pool that is associated with at least one of the relay communication device or the remote terminal.

7. The relay communication device according to claim 1, wherein the first information is given in notification from an external device at a specific timing corresponding to a current parameter set.

8. The relay communication device according to claim 1, wherein the parameter set includes a parameter related to link adaptation.

9. The relay communication device according to claim 1, wherein the parameter set includes a parameter related to channel estimation.

10. The relay communication device according to claim 1, wherein the parameter set includes priority of a synchronization source.

11. The relay communication device according to claim 1, wherein the parameter set includes at least one of a parameter related to transmission power, a parameter related to resource pool allocation, a parameter related to retransmission control, or a parameter related to repetition transmission.

12. The relay communication device according to claim 1, wherein the second information is an index corresponding to a specific settable parameter set.

13. The relay communication device according to claim 1, wherein the second information is a specific settable parameter set.

14. The relay communication device according to claim 1, wherein the category of the terminal is one of an MTC terminal, an NB-IoT terminal, a smartphone, a sensor device, or a vehicular onboard unit.

15. A base station, comprising:
a central processing unit (CPU) configured to:
   determine a parameter set based on first information that indicates a communication status related to a distance or traffic between a relay communication device and a remote terminal, wherein
      the parameter set is settable regarding communication between the relay communication device and the remote terminal,
      the first information includes a category of terminal corresponding to at least one of the relay communication device or the remote terminal,
      the first information further includes information associated with received power of a sidelink established between the relay communication device and the remote terminal,
      the received power of the sidelink includes parameters related to one of an averaging process or a filtering process,
      the parameters are associated with a measurement of at least one of sidelink reference signal received power (S-RSRP) or sidelink reference signal received quality (S-RSRQ),
      a timing of the measurement of at least one of the S-RSRP or the S-RSRQ corresponds to one of a fixed timing, a dynamic timing, or a specific timing based on the first information,
      the timing of the measurement is based on the first information that indicates the communication status of the relay communication device such that an availability of the relay communication device is based on a comparison between the first information and threshold information,
      the threshold information is set by the relay communication device, and
      the timing of the measurement is further based on an operation mode; and
   notify the relay communication device and the remote terminal of second information, wherein the second information indicates a result of the determination of the parameter set.

16. A method, comprising:
determining a parameter set based on first information that indicates a communication status related to a distance or traffic between a relay communication device and a remote terminal, wherein
   the parameter set is settable regarding communication between the relay communication device and the remote terminal,
   the first information includes a category of terminal corresponding to at least one of the relay communication device or the remote terminal,
   the first information further includes information associated with received power of a sidelink established between the relay communication device and the remote terminal,
   the received power of the sidelink includes parameters related to one of an averaging process or a filtering process,
   the parameters are associated with a measurement of at least one of sidelink reference signal received power (S-RSRP) or sidelink reference signal received quality (S-RSRQ),
   a timing of the measurement of at least one of the S-RSRP or the S-RSRQ corresponds to one of a fixed timing, a dynamic timing, or a specific timing based on the first information,
   the timing of the measurement is based on the first information that indicates the communication status of the relay communication device such that an availability of the relay communication device is based on a comparison between the first information and threshold information,
   the threshold information is set by the relay communication device, and
   the timing of the measurement is further based on an operation mode; and
notifying the remote terminal of second information, wherein the second information indicates a result of the determination of the parameter set.

17. A method, comprising:
determining a parameter set based on first information that indicates a communication status related to a distance or traffic between a relay communication device and a remote terminal, wherein
   the parameter set is settable regarding communication between the relay communication device and the remote terminal, the first information includes a category of terminal corresponding to at least one of the relay communication device or the remote terminal, the first information further includes information associated with received power of a sidelink established between the relay communication device and the remote terminal, the received power of the sidelink includes parameters related to one of an averaging process or a filtering process, the parameters are associated with a measurement of at least one of sidelink reference signal received power (S-RSRP) or sidelink reference signal received quality (S-RSRQ), a timing of the measurement of at least one of the S-RSRP or the S-RSRQ corresponds to one of a fixed timing, a dynamic timing, or a specific timing based on the first information, the timing of the measurement is based on the first information that indicates the communication status of the relay communication device such that an availability of the relay communication device is based on a comparison between the first information and threshold information, the threshold information is set by the relay communication device, and the timing of the measurement is further based on an operation mode; and notifying each of the relay communication device and the remote terminal of second information, wherein the second information indicates a result of the determination of the parameter set.

18. A non-transitory computer-readable medium having stored thereon computer-executable instructions that, when executed by a relay communication device, cause the relay communication device to execute operations, the operations comprising:

determining a parameter set based on first information that indicates a communication status related to a distance or traffic between the relay communication device and a remote terminal, wherein the parameter set is settable regarding communication between the relay communication device and the remote terminal, the first information includes a category of terminal corresponding to at least one of the relay communication device or the remote terminal, the first information further includes information associated with received power of a sidelink established between the relay communication device and the remote terminal, the received power of the sidelink includes parameters related to one of an averaging process or a filtering process, the parameters are associated with a measurement of at least one of sidelink reference signal received power (S-RSRP) or sidelink reference signal received quality (S-RSRQ), a timing of the measurement of at least one of the S-RSRP or the S-RSRQ corresponds to one of a fixed timing, a dynamic timing, or a specific timing based on the first information, the timing of the measurement is based on the first information that indicates the communication status of the relay communication device such that an availability of the relay communication device is based on a comparison between the first information and threshold information, the threshold information is set by the relay communication device, and the timing of the measurement is further based on an operation mode; and notifying the remote terminal of second information, wherein the second information indicates a result of the determination of the parameter set.

19. A non-transitory computer-readable medium having stored thereon computer-executable instructions that, when executed by a base station, cause the base station to execute operations, the operations comprising:

determining a parameter set based on first information that indicates a communication status related to a distance or traffic between a relay communication device and a remote terminal, wherein the parameter set is settable regarding communication between the relay communication device and the remote terminal, the first information includes a category of terminal corresponding to at least one of the relay communication device or the remote terminal, the first information further includes information associated with received power of a sidelink established between the relay communication device and the remote terminal, the received power of the sidelink includes parameters related to one of an averaging process or a filtering process, the parameters are associated with a measurement of at least one of sidelink reference signal received power (S-RSRP) or sidelink reference signal received quality (S-RSRQ), a timing of the measurement of at least one of the S-RSRP or the S-RSRQ corresponds to one of a fixed timing, a dynamic timing, or a specific timing based on the first information the timing of the measurement is based on the first information that indicates the communication status of the relay communication device such that an availability of the relay communication device is based on a comparison between the first information and threshold information, the threshold information is set by the relay communication device, and the timing of the measurement is further based on an operation mode; and notifying each of the relay communication device and the remote terminal of second information, wherein the second information indicates a result of the determination of the parameter set.

* * * * *